(12) United States Patent
Hirose

(10) Patent No.: US 9,288,354 B2
(45) Date of Patent: Mar. 15, 2016

(54) IMAGE FORMING APPARATUS, AND CONTROL METHOD FOR IMAGE FORMING APPARATUS

(71) Applicant: Canon Kabushiki Kaisha, Tokyo (JP)

(72) Inventor: Hideki Hirose, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/018,160

(22) Filed: Sep. 4, 2013

(65) Prior Publication Data

US 2014/0063528 A1   Mar. 6, 2014

(30) Foreign Application Priority Data

Sep. 6, 2012  (JP) .................. 2012-196362

(51) Int. Cl.
| | | |
|---|---|---|
| G06F 3/12 | (2006.01) | |
| G06K 15/00 | (2006.01) | |
| G06F 1/26 | (2006.01) | |
| G06F 1/28 | (2006.01) | |
| H04N 1/00 | (2006.01) | |
| H04N 1/32 | (2006.01) | |

(52) U.S. Cl.
CPC ....... *H04N 1/00891* (2013.01); *H04N 1/00323* (2013.01); *H04N 1/00928* (2013.01); *H04N 1/32625* (2013.01); *H04N 1/32657* (2013.01); *H04N 2201/0074* (2013.01); *H04N 2201/0094* (2013.01)

(58) Field of Classification Search
CPC ........... G06K 15/4055; H04N 1/00885; G06F 1/3231; Y02B 60/1267
See application file for complete search history.

(56) References Cited

U.S. PATENT DOCUMENTS

| | | | |
|---|---|---|---|
| 8,352,768 B2* | 1/2013 | Starr et al. ............... | 713/323 |
| 2009/0313493 A1* | 12/2009 | Ide ........................... | 713/323 |
| 2009/0325493 A1* | 12/2009 | Suzuki ..................... | 455/41.3 |
| 2012/0241625 A1* | 9/2012 | Masumoto et al. ...... | 250/348 |
| 2012/0327458 A1* | 12/2012 | Baba et al. ............... | 358/1.15 |
| 2013/0128298 A1* | 5/2013 | Yamada .................... | 358/1.13 |

FOREIGN PATENT DOCUMENTS

| | | |
|---|---|---|
| CN | 1731813 A | 2/2006 |
| CN | 101526773 A | 9/2009 |
| CN | 102065195 A | 5/2011 |
| CN | 102480579 A | 5/2012 |
| CN | 102587476 A | 7/2012 |
| JP | 11-202690 A | 7/1999 |
| JP | 2005-017938 A | 1/2005 |

\* cited by examiner

*Primary Examiner* — Thomas Lett
(74) *Attorney, Agent, or Firm* — Canon USA, Inc. IP Division

(57) ABSTRACT

An image forming apparatus is provided that is capable of returning from a sleep state in response to detection of a user or upon receipt of an input, wherein notification of failure to detect a user is provided if the image forming apparatus returns from a sleep state based on receipt of an input for more than a predetermined number of times.

29 Claims, 22 Drawing Sheets

390
PYROELECTRIC SENSOR
DETECTION RANGE

FIG.6

| ID | PYROELECTRIC SENSOR | POWER-SAVING BUTTON |
|----|---------------------|---------------------|
| 1  | ×                   | ○                   |
| 2  | ×                   | ○                   |
| 3  | ×                   | ○                   |
| 4  | ×                   | ○                   |
| 5  | ×                   | ○                   |

FIG.13

| ID | PYROELECTRIC SENSOR | INFRARED REFLECTIVE SENSOR | POWER-SAVING BUTTON |
|---|---|---|---|
| 1 | × | × | ○ |
| 2 | × | × | ○ |
| 3 | × | × | ○ |
| 4 | × | × | ○ |
| 5 | × | × | ○ |

FIG.14

| ID | PYROELECTRIC SENSOR | INFRARED REFLECTIVE SENSOR | POWER-SAVING BUTTON |
|---|---|---|---|
| 1 | ○ | × | ○ |
| 2 | ○ | × | ○ |
| 3 | ○ | × | ○ |
| 4 | ○ | × | ○ |
| 5 | ○ | × | ○ |

IMAGE FORMING APPARATUS, AND CONTROL METHOD FOR IMAGE FORMING APPARATUS

BACKGROUND

1. Field

Aspects of the present invention generally relate to an image forming apparatus that detects a user and returns the image forming apparatus to a standby state from a sleep state.

2. Description of the Related Art

In a single function peripheral (SFP) such as a printer or the like, or a multi-function peripheral (MFP) including a plurality of these functions, awareness of environmental issues has increased in recent years. These devices are provided with power-saving functions of shifting to a sleep state (power-saving state) while they are not in use, thus reducing their power consumption(s).

These devices perform return-from-sleep operation from a sleep state to a standby state according to whether, for example, they receive print jobs, or a specific time is reached. Further, these devices, in a case where the device is in the sleep state when a user moves in front of a device and operates it, perform a return operation from the sleep state by a power saving button pressed by the user for returning to the standby state from the power saving state.

However, since the return-from-sleep operation will not be performed if the user does not press the power saving button, and the return-from-sleep operation begins only after the button is pressed, the user will be forced to wait in front of the device until the device returns to a usable state (standby state).

A device capable of detecting a human body coming close to a device with a sensor (hereinafter, referred to as a human sensor), and automatically shifting to a standby state from a low power mode or a sleep state is known (see Japanese Patent Application Laid-Open No. 11-202690).

Further, there are some devices that improve energy-saving properties and inhibit erroneous detections by providing two human sensors having different characteristics. This technique is designed by combining two types of sensors, a pyroelectric sensor and a reflective sensor, to perform energy-saving by constantly energizing the pyroelectric sensor with extremely small power consumptions and not energizing the reflective sensor from initial stage. Further, in order to suppress a number of times of returns from sleep caused by erroneously detecting a person simply passing in front of the image forming apparatus, the return-from-sleep operation is executed only when both the pyroelectric sensor and the reflective sensor detect an approach of a human body.

In such a device, when the return-from-sleep operation is started by detecting an approach of a human body using the human sensor, and the user comes in front of the operation unit of the device and operates it, the device has already shifted to the standby state. Consequently, the user can comfortably use the device without virtually any waiting time.

However, conventionally, in an image forming apparatus that returns from the sleep state using the human sensor, in some cases the human sensor may not operate properly due to decrease of a detection range of the human sensor resulting from device failure, or installation environment of the image forming apparatus, etc. Japanese Patent Application Laid-Open No. 11-202690 does not address this situation.

In the event a human sensor is malfunctioning, the human sensor will not be effective. In such a case, even when a user moves into a detection range of the human sensor, the human sensor is unable to detect the user, and thus the return-from-sleep operation is not executed. Therefore, the return-from-sleep operation has to be performed by the user pressing the power-saving button, and convenience of the image forming apparatus equipped with the human sensor will be impaired.

A user who knows that a device is equipped with the human sensor may become aware if the human sensor malfunctions. However, a user who does not know the device is equipped with a human sensor will not know if the human sensor is malfunctioning. Therefore, a delay in repairing the human sensor will occur.

SUMMARY

Aspects of the present invention are generally directed to providing notification indicating that a detection unit for detecting a user and returning an image forming apparatus from a power saving state is not operating properly and prompting the user to cause a service engineer to make repair.

According to an aspect of the present invention, an image forming apparatus that operates in a first electric power state and a second electric power state where less power is consumed than in the first electric power state, includes a first detection unit configured to detect an object, an operation unit configured to receive input, wherein receipt of the input shifts the image forming apparatus from the second electric power state to the first electric power state, a control unit configured to, when the first detection unit detects an object or the operation unit receives the input, shift the image forming apparatus from the second electric power state to the first electric power state, and a notification unit configured to provide information indicating a failure condition of the first detection unit if the image forming apparatus has shifted from the second electric power state to the first electric power state as a result of the operation unit receiving the input.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates an example of a return-from-sleep factor management table that manages a factor for return from sleep caused by a user's main body operation of the image forming apparatus.

FIG. 13 illustrates an example of a return-from-sleep factor management table when a certain failure is occurring in the pyroelectric sensor.

FIG. 14 illustrates an example of a return-from-sleep factor management table when a certain failure is occurring in the reflective sensor.

DESCRIPTION OF THE EMBODIMENTS

Various exemplary embodiments, features, and aspects of the disclosure will be described in detail below with reference to the drawings.

Figure 1:
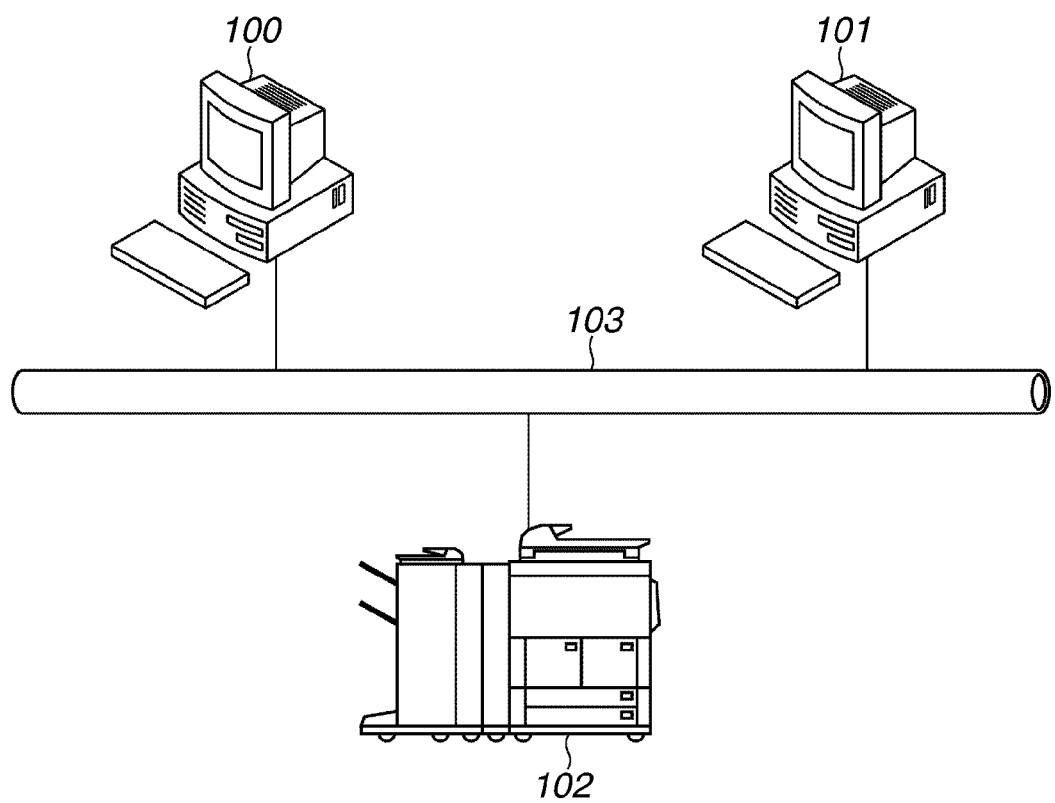
FIG. 1 is a diagram illustrating a configuration example of the entire system to which an image forming apparatus according to an exemplary embodiment can be applied.

FIG. 1 is a diagram illustrating a configuration example of the entire system to which an image forming apparatus according to an exemplary embodiment can be applied. As illustrated in FIG. 1, information processing apparatuses 100 and 101, and an image forming apparatus 102 are connected to a local area network (LAN) 103 to communicate with one another. The image forming apparatus 102 may be an MFP or an SFP.

Figure 2:
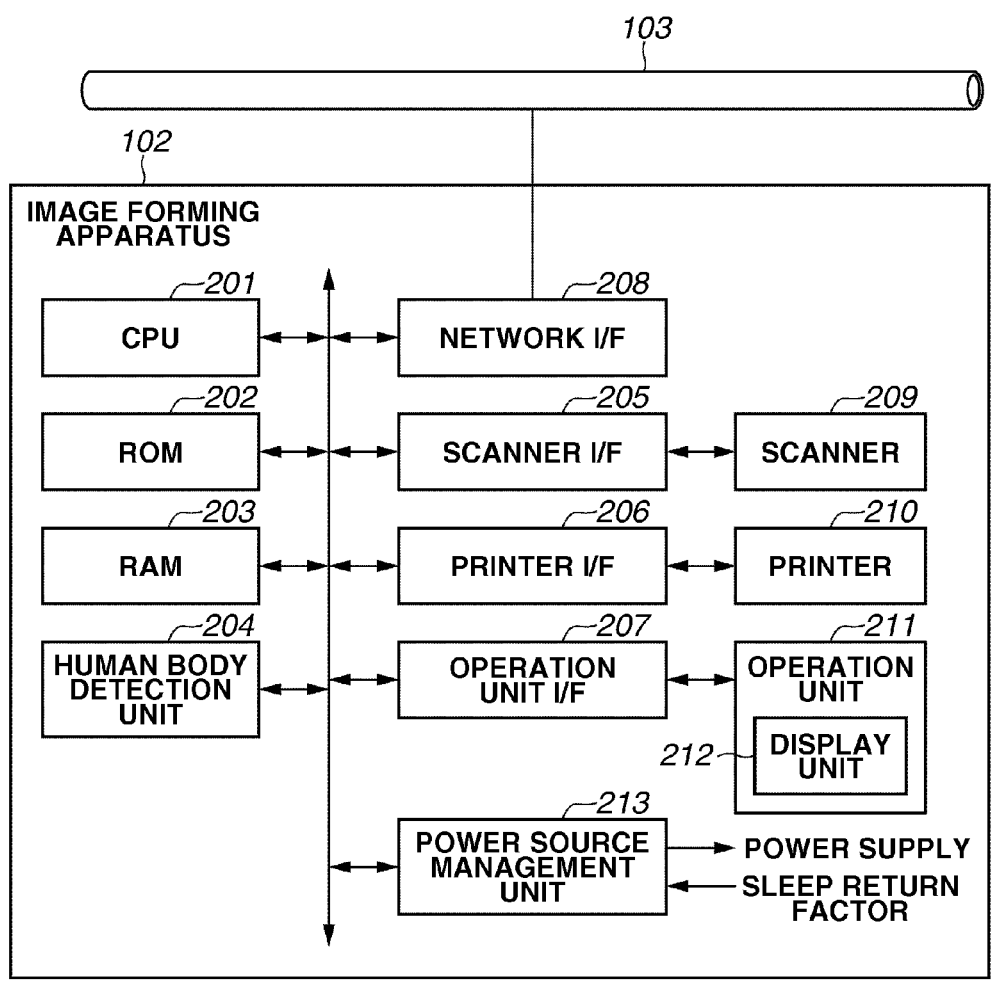
FIG. 2 is a block diagram illustrating an example of configuration of an image forming apparatus in a first exemplary embodiment.

FIG. 2 is a block diagram illustrating an example of a configuration of the image forming apparatus 102 in the first exemplary embodiment. A central processing unit (CPU) 201 performs processing of input image data or various types of controls such as print control, by reading and executing a control program computer-readably recorded on a read only memory (ROM) 202. The ROM 202 is a flash ROM, and is used to store therein the above-described control program, threshold values described below, and the like.

A random access memory (RAM) 203 is used in a partial region as a main memory, a work area or the like of the CPU 201, and is also used to store therein count values described below and the like. Further, the RAM 203 is used for printing, storage, transfer, and other uses. For example, image data of a document read by a scanner 209 is transmitted to and stored in the RAM 203 via a scanner interface (I/F) 205. Further, image data (for example, image data read by the above-described scanner) which should be printed by a printer 210 is read from the RAM 203 and is transmitted to the printer 210 via a printer I/F 206, then is printed on a paper sheet by the printer 210.

An operation unit 211 is connected to a bus, via an operation unit I/F 207. The operation unit 211 can be, but is not limited to, a simple switch, a a light-emitting diode (LED,) or a liquid crystal display (LCD) display unit of a touch panel. Information input into the operation unit 211 is passed to the CPU 201 via the operation unit I/F 207, and desired processing is performed on the information. Along with this, display is performed on a display unit 212 equipped on the operation unit 211.

A network I/F 208 transmits image data or information to the information processing apparatuses 100, 101 on the LAN 103, and reversely receives print data or various types of information from the information processing apparatuses 100, 101 on the LAN 103.

A human body detection unit 204 is configured with a human sensor that detects a human body approaching the image forming apparatus 102. The human sensors include an active sensor that emits infrared rays by itself, and a passive sensor that operates by sensing infrared rays released from a human body surface, without emitting infrared rays of itself.

A power source management unit 213 supplies power to all blocks, or some blocks within the image forming apparatus 102. When the image forming apparatus 102 enters asleep state, power-saving is realized by supplying power to minimum necessary portions.

In the sleep state, only the power source management unit 213, the RAM 203, the network I/F 208, the human body detection unit 204, the operation unit I/F 207, and a portion of the operation unit 211 (detection circuit of a power saving button 215) are energized, and power sources of the CPU 201, the ROM 202, the scanner I/F 205, the printer I/F 206, the scanner 209, and the printer 210 are shut off. Further, also among respective energized blocks, the RAM 203 is in a self-refresh state. Further, the power source management unit 213 receives a request for shifting from the sleep state to the standby state, by reception of the print data from the information processing apparatuses 100, 101, or by the human body detection unit 204 detecting an approach of a human body, and executes return-from-sleep by supplying power to necessary portions as appropriate. By such management of the power source management unit 213, the image forming apparatus 102 can be operated at least in a normal state (a first electric power state) and in a power saving state (second electric power state) in which less electric power than in the normal state is consumed. The details of a configuration and power supply control of the power source management unit 213 will be described below with reference to FIG. 21.

Figure 21:
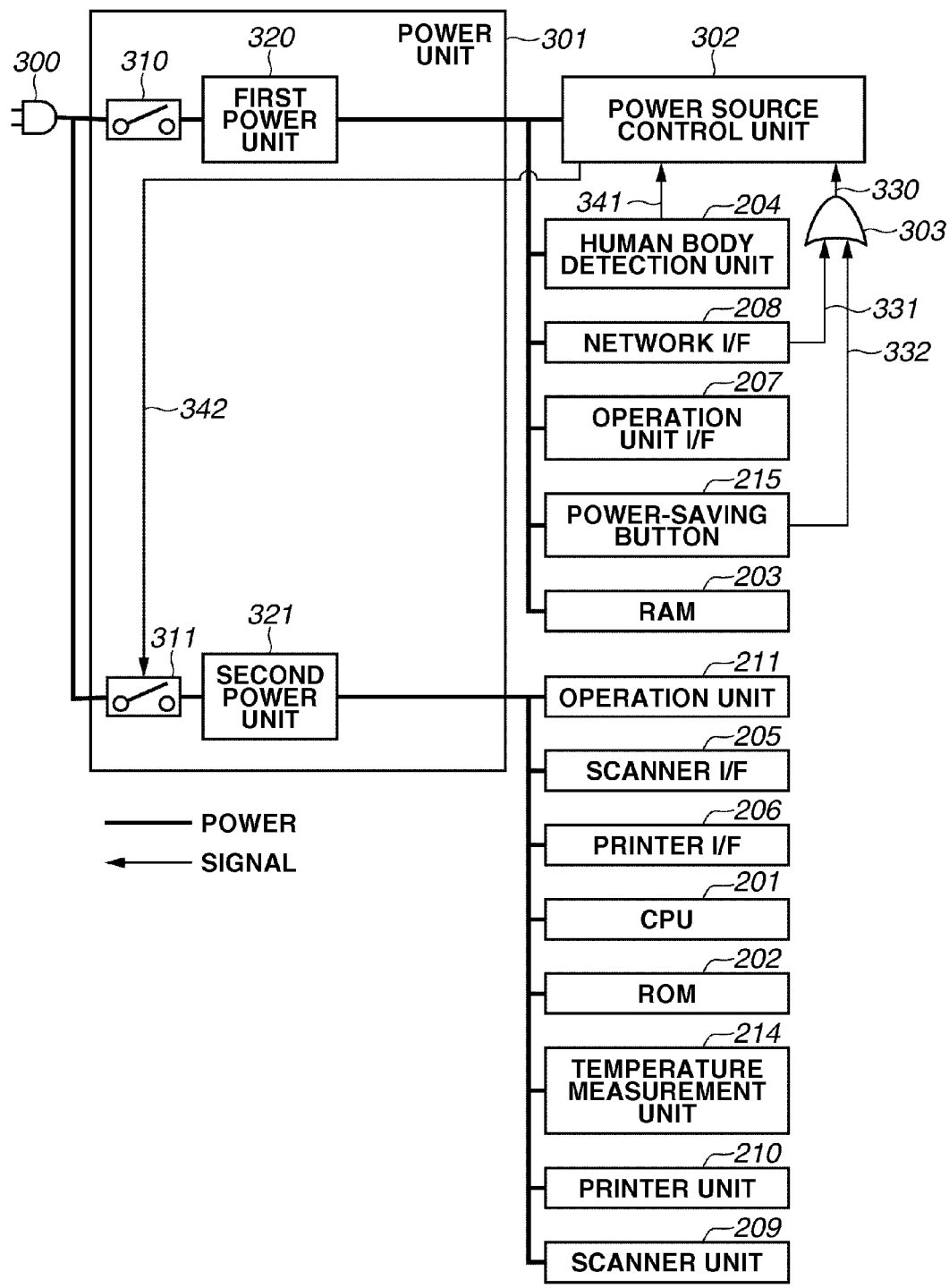
FIG. 21 is block diagram illustrating an example of configuration of a power source management unit according to the first exemplary embodiment.

FIG. 21 is a block diagram illustrating an example of a configuration of the power source management unit 213 according to the first exemplary embodiment. The power source management unit 213 includes a power unit 301, a power source control unit 302, and a logic 303. A power that is input from a power 300 is connected to a SW 310 and a SW 311. Electric power supplied from the power 300 is separately supplied to a first power unit 320 and a second power unit 321 via the SW 310 and the SW 311. The first power unit 320 supplies electric power to a block that operates in the sleep state. Further, the second power unit 321 supplies power to a block that does not operate in the sleep state.

The SW 310 is turned on or off by a seesaw SW or a button SW that can be turned on or off manually by a user. When the SW 310 is turned on, electric power is supplied from the first power unit 320 to the power source control unit 302. This will allow the power source control unit 302 to start up, and an ON command 342 is transmitted from the power source control unit 302 to the SW 311, and electric power is supplied from the second power unit 321 to respective components. This will allow the image forming apparatus 102 to shift to the standby state (normal state).

Further, in a case where the image forming apparatus 102 satisfies a condition, for example, that it has not been used for a predefined time, an OFF command is transmitted from the power source control unit 302 to the SW 311, and power supply to the second power unit 321 is shut off. This will allow the image forming apparatus 102 to shift to the sleep state (power-saving state). The sleep state is a state in which electric power is consumed less than in the standby state.

The condition that the image forming apparatus 102 returns to the standby state from the sleep state is that the human body detection unit 204 detects a human. The human body detection unit 204, when detecting a human, transmits a detection signal 341, which turns on the SW 311 to the power source control unit 302. Further, the logic 303 transmits a shift request signal 330 to the power source control unit 302, in a case of receiving even one request signal (331, 332) that requires shifting to the standby state. Hereinbelow, the shift request signals (331, 332) will be described respectively.

A network I/F 208 transmits the request signal 331 to the logic 303, upon receiving a command that requires shifting to the normal electric power mode when a print job is to be performed, for example. Further, when a power saving button 215 is pressed by the user, a detection circuit of the power saving button 215 transmits the request signal 332 to the logic 303.

The power source control unit 302, upon receiving the detection signal 341 from the human body detection unit 204, or the shift request signal 330 from the logic 303, transmits the ON command 342 to the SW 311. The SW 311 is turned on by the ON command 342, and power feeding to the second power unit 321 is started. In other words, in the image forming apparatus 102, electric power is supplied to the CPU 201 in the normal state (the first electric power state), and electric power is not supplied to the CPU 201 in the power-saving state (the second electric power state).

Figure 3:
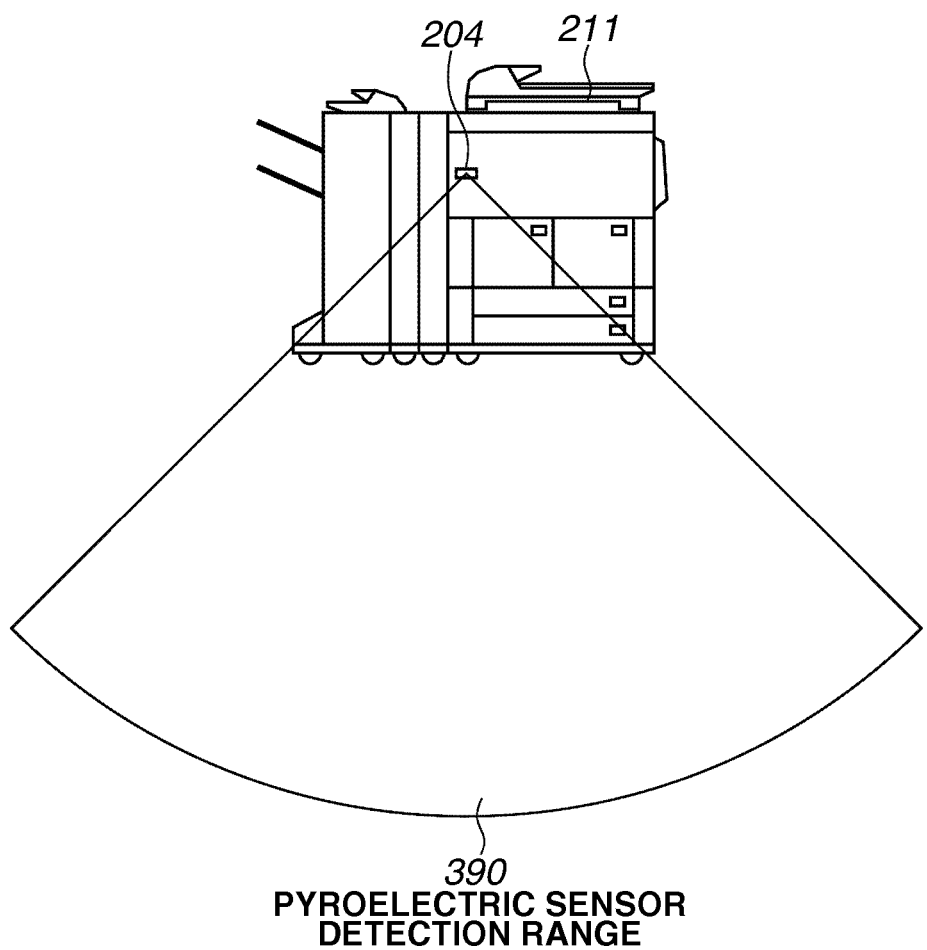
FIG. 3 is a diagram illustrating a detection range of a first human body detection unit in a case where a pyroelectric sensor is used for a human body detection unit.

Hereinbelow, a detection range when the pyroelectric sensor is used for the human body detection unit 204 will be described. FIG. 3 is a diagram illustrating a detection range of the human body detection unit 204 when the pyroelectric sensor is used for the human body detection unit 204. From now on, descriptions will be given assuming that the pyroelectric sensor (pyroelectric type infrared sensor) is used for the human body detection unit 204, but the reflective sensor (reflection type infrared the sensor) may also be used. Further, the human body detection unit 204 may be one infrared sensor, or an infrared sensor array in which a plurality of infrared sensors is arrayed in a matrix pattern. Also, a sensor other than the infrared sensor may be used for the human body detection unit 204.

As described above, the pyroelectric sensor is a passive type human sensor, and is used to detect an approach of human body by detecting temperature change caused by infrared rays naturally radiated from a body having a temperature such as a human body. The pyroelectric sensor is characterized by a small power consumption, and relatively wide detection region. However, the pyroelectric sensor has a disadvantage that it cannot detect a stationary body, or has a disadvantage that a detection range that should be originally detected becomes narrow, in a case where difference between ambient environment temperature and temperature of human body is small.

As illustrated in FIG. 3, the human body detection unit 204 (pyroelectric sensor) is attached on a front surface of the image forming apparatus 102, and has a detection range 390 in a radiation direction obliquely toward downward. When a user moves into a detection range 390 of the first human body detection unit 204, while the image forming apparatus 102 is in the sleep state, the human body detection unit 204 detects an approach of a human body, transmits the detection signal 341 to the power source control unit 302, and executes the return-from-sleep operation.

However, in a case where the human body detection unit 204 does not operate properly for a certain cause, even if a human body moves into the detection range 390 of the human body detection unit 204, it is possible that the human body detection unit 204 cannot detect it. In such a case, the user ends up returning from sleep by explicitly pressing the power saving button 215 provided on the operation unit 211 of the image forming apparatus 102.

Figure 4:
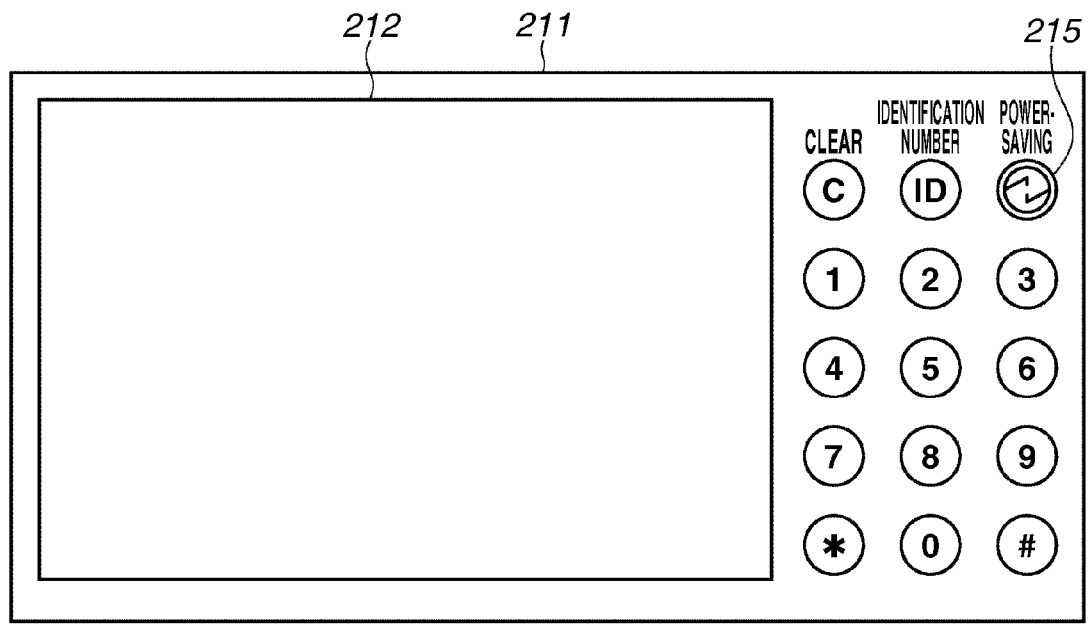
FIG. 4 is a diagram illustrating an example of an operation unit.

FIG. 4 is a diagram illustrating an example of the operation unit 211. As illustrated in FIG. 4, the operation unit 211 has the display unit 212, besides several buttons, including the power saving button 215. The power saving button 215 is used to instruct return to the normal state from the power saving state, by the user operation. Typically, the power saving button 215 is provided with an LED, and it is configured such that, when the image forming apparatus 102 enters the sleep state, the LED of the power saving button 215 lights up, and helps the user see that the image forming apparatus 102 is currently in the sleep state.

As described above, the power saving button 215 has a detection circuit (not-illustrated), and when the power saving button 215 is pressed in the sleep state, the above-described detection circuit detects it, and the image forming apparatus 102 returns from the sleep state.

Figure 5:
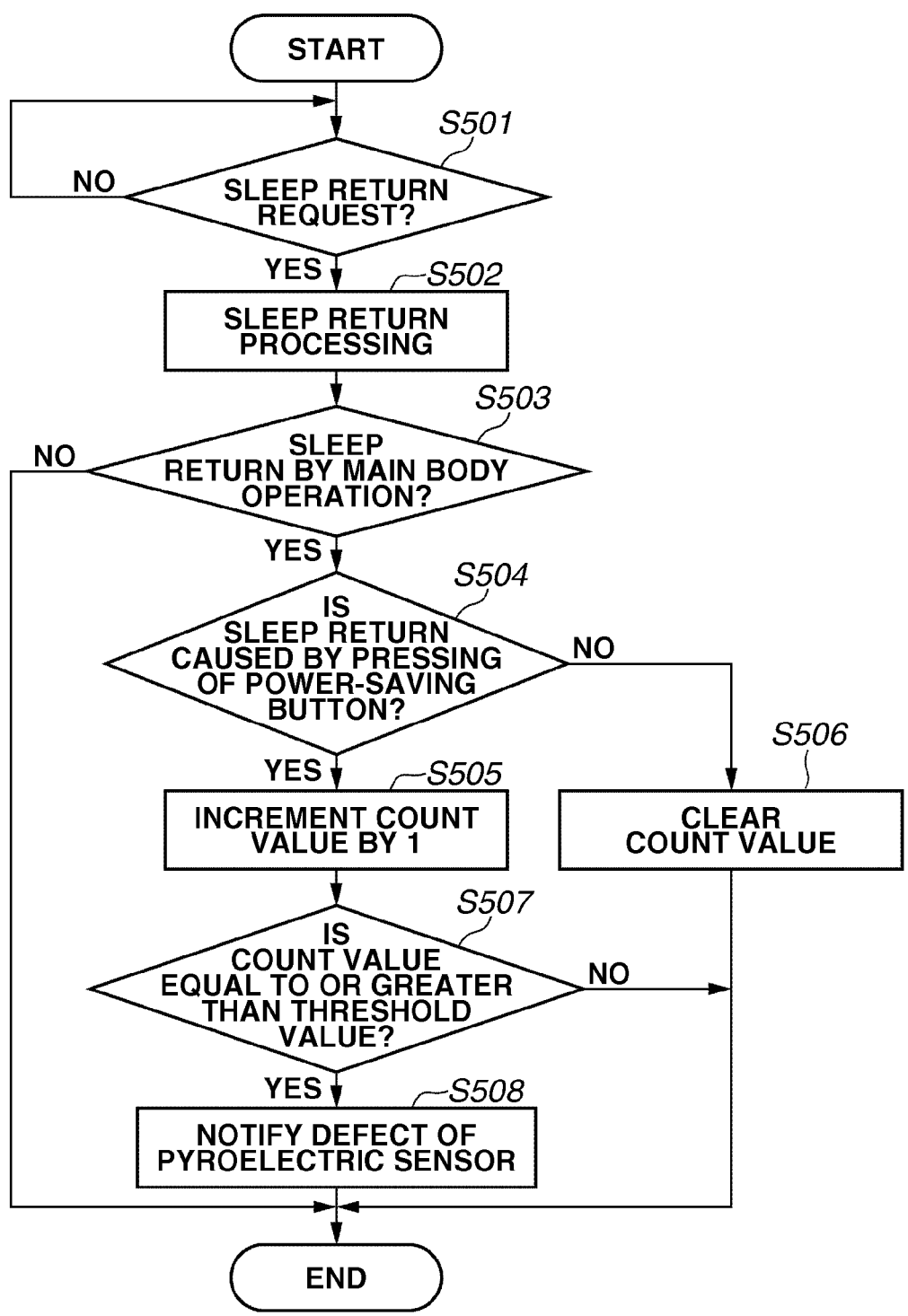
FIG. 5 is a flowchart illustrating an example of control procedure of the image forming apparatus in the first exemplary embodiment.

Hereinbelow, in the first exemplary embodiment, a control procedure of the image forming apparatus 102 in the event that a certain failure occurs in the pyroelectric sensor will be described with reference to FIG. 5. FIG. 5 is a flowchart illustrating an example of control procedure of the image forming apparatus 102 in the first exemplary embodiment. S501 through S508 indicate respective steps. Further, the processing in step S502 through step S508 is realized by causing the CPU 201 to read and execute a program computer-readably recorded on the ROM 202 in the image forming apparatus 102.

The processing of FIG. 5 begins from a state in which the image forming apparatus 102 is in the sleep state. In the sleep state, in step S501, the power source control unit 302 sustains the sleep state until a request is received (reception of the signal 341 or 330) for return to the standby state from the sleep state.

Then, if the request for the return from sleep is received (the signal 341 or 330 is received) (YES in step S501), the power source control unit 302 transmits the ON command 342 to the SW 311, and supplies power to respective modules in the image forming apparatus 102. The CPU 201 starts up by the power supply, and in step S502, the CPU 201 executes return-from-sleep processing.

Next, in step S503, the CPU 201 checks for cause of the return from sleep. Causes of the returns from sleep include an operation outside a main body and an operation in the main body. The return from sleep caused by the operation outside the main body includes various factors such as print data reception from the information processing apparatuses 100, 101 as previously described, FAX reception (not-illustrated), and the return by a timer (not-illustrated). The return from sleep by main body operation include pressing of the power saving button 215 of the operation unit 211 in the image forming apparatus 102 main body and detection of human body approach in the human body detection unit 204. In step S503, the CPU 201 determines whether return from sleep is caused by main body operation. Any checking method that enables practice of the present embodiment is applicable. For example, if it is determined that the return from sleep is not caused by the return from sleep operation outside the main body, the CPU 201 determines that the cause of the return from sleep is the return from sleep operation in the main body.

Then, in step S503, if it is determined that the cause of the return from sleep is not the return from sleep operation in the main body (NO in step S503), the CPU 201 ends the processing in the flowchart and directly processes various types of jobs.

On the other hand, if it is determined that the cause of the return from sleep is the return from sleep operation in the main body (YES in step S503), the CPU 201 advances the processing to step S504.

In step S504, the CPU 201 checks the details of the causes of the returns from sleep. In this process, the CPU 201 checks whether the return-from-sleep cause is pressing of the power saving button 215. Any checking method that would enable practice of the present embodiment is applicable. For example, a state when pressing of the power saving button 215 has been detected is held in the detection circuit of the power saving button 215, and by checking for this state by the CPU 201, it may be determined that return-from-sleep was caused by pressing of the power saving button 215. Alternatively, the CPU 201 inquires the power source control unit 302, and a determination is made depending on whether there has been an input of the detection signal 341 from the human body detection unit 204.

Then, in the above step S504, if it is determined that the return-from-sleep is caused by pressing of the power saving button 215 (YES in step S504), the CPU 201 advances the processing to step S505. In step S505, the CPU 201 increments by 1 a value of a counter for counting a number of times of consecutive returns by the power saving button 215. The count value is stored in a storage medium such as the ROM 202 or the RAM 203.

On the other hand, a determination in step S504 that the return-from-sleep is not caused by the pressing of the power saving button 215 (NO in step S504) indicates that the pyroelectric sensor is operating properly. Therefore, in step S506, the CPU 201 clears a counter value indicating a number of times of consecutive returns by presses of the power saving button 215, and ends the processing in the flowchart.

In step S504, if it is determined that the return-from-sleep is caused by the pressing of the power saving button 215, and in the step S505, a value of the counter is incremented by 1, the CPU 201 advances the processing to step S507.

In step S507, the CPU 201 performs a comparison between a value of a counter indicating a number of times of consecutive returns by the power saving button 215 and a predetermined threshold value. Then, in step S507, if it is determined that a counter value indicating a number of times of consecutive returns by presses of the power saving button 215 is less than the predetermined threshold value (NO in step S507), the CPU 201 ends the processing in the flowchart, while maintaining the count value.

On the other hand, in step S507, if it is determined that the count value is greater than or equal to the threshold value (YES in step S507), the CPU 201 determines that a certain failure is occurring in the human body detection unit 204 (pyroelectric sensor), and advances the processing to step S508. The threshold value can be freely set via the operation unit 211.

FIG. 6 illustrates an example of a return-from-sleep factor management table that manages causes of returns from sleep performed by main body operation of a user in the image forming apparatus 102. A symbol "o" in FIG. 6 indicates cause of return-from-sleep, and "x" indicates not cause of return-from-sleep.

FIG. 6 indicates an example when the threshold value is 5 times. In the example of FIG. 6, since the returns from sleep by presses of the power saving button 215 by the user are performed 5 times consecutively, without the returns from sleep caused by the human body detection unit 204 (pyroelectric sensor), the CPU 201 determines that failure is occurring in the human body detection unit 204 (pyroelectric sensor), as a result of the comparison in step S507.

Figure 7:
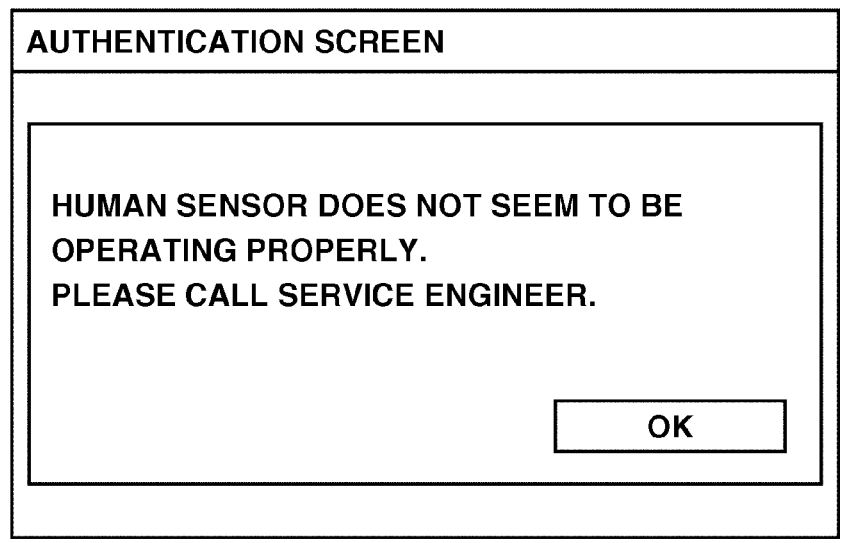
FIG. 7 illustrates an example of a display for notifying a defect in step S507 of FIG. 5.

In this way, if it is determined that a certain failure is occurring in the human body detection unit 204 (pyroelectric sensor), then in step S508, the CPU 201 notifies the defect of the human body detection unit 204 (pyroelectric sensor) (FIG. 7).

FIG. 7 illustrates an example of a display that notifies a defect in step S507 of FIG. 5. In this way, the returns from sleep of the image forming apparatus 102 end, and the CPU 201 notifies the defect of the pyroelectric sensor at timing that a login authentication screen is displayed, and displays a message prompting repair to be made by service engineer call on the display unit 212. In this process, the message is displayed on the display unit 212 of the image forming apparatus 102. However, the CPU 201 may transmit (notify) the message to the information processing apparatuses 100, 101 of the administrators through the LAN 103.

As described above, in the event that the returns by presses of the power saving button 215 by the user have taken place consecutively, in spite that the human sensor is equipped on the image forming apparatus 102, it is found out that a certain failure is occurring on the human sensor. Thus, a downtime of the human sensor can be reduced by a message saying that there is a certain failure on the human sensor.

In the above-described first exemplary embodiment, it is a case where only one pyroelectric sensor is equipped as the human body detection unit 204. However, actually, while the human sensor can detect an approach of a person, it does not mean that it can recognize a user, and it sometimes erroneously detects a pedestrian who only passes by. If the erroneous detections occur frequently, it causes the image forming apparatus 102 to frequently return to the standby state from the sleep state, reducing energy-saving performance. In the second exemplary embodiment, energy-saving properties and inhibition of erroneous detections are realized by combining two human sensors with different characteristics, while making good use of advantages of both sensors.

Figure 8:
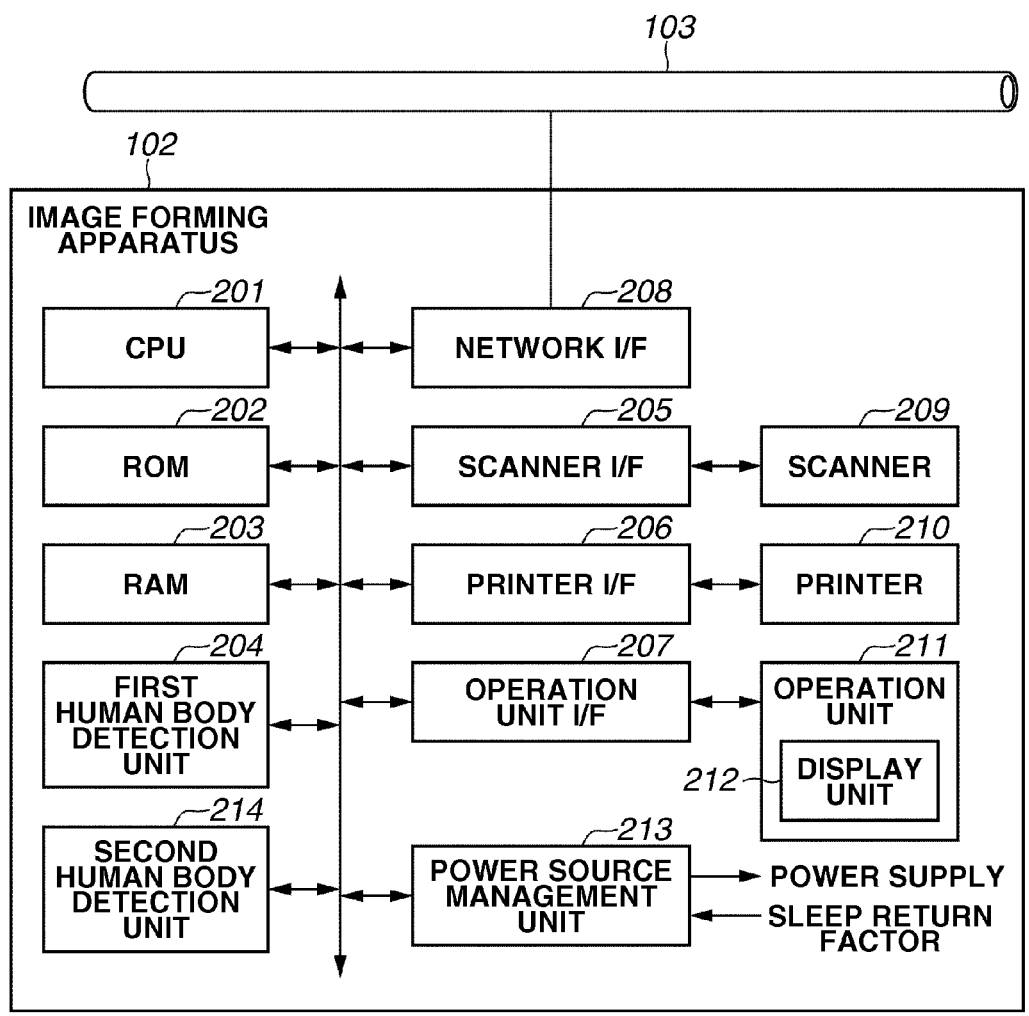
FIG. 8 is a block diagram illustrating an example of configuration of an image forming apparatus in a second exemplary embodiment.

FIG. 8 is a block diagram illustrating an example of a configuration of the image forming apparatus 102 in the second exemplary embodiment. Identical components to the first exemplary embodiment (FIG. 2) are assigned identical reference numerals, and therefore descriptions thereof will be omitted, and only different portions will be described.

As illustrated in FIG. 8, a first human body detection unit 204 (first detection unit), and a second human body detection unit 214 (second detection unit) are equipped in the image forming apparatus 102 according to the second exemplary embodiment. In the present exemplary embodiment, a pyroelectric sensor (pyroelectric type infrared sensor) is used for the first human body detection unit 204, and an infrared reflective sensor (reflective type infrared sensor, hereinafter, referred to as a reflective sensor) is used for the second human body detection unit 214. The reflective sensor radiates infrared rays on its own, and the infrared rays are reflected from human body surface to be received by the reflective sensor. The reflective sensor is used to detect a human body by examining change in amount of received infrared rays. The reflective sensor is characterized in that startup time is short, and stationary object can be also detected. However, the reflective sensor emits infrared rays on its own, and therefore has a disadvantage that larger power is consumed, and a detection region is narrow. Further, the first human body detection unit 204 may be one infrared sensor, or may be an infrared sensor array in which a plurality of infrared sensors is arrayed in a matrix pattern. The second human body detection unit 214 may be one infrared sensor, or may be an infrared sensor array in which a plurality of infrared sensors is arrayed in a matrix pattern. Alternatively, the human body detection unit may use a sensor other than the infrared sensor.

Figure 22:
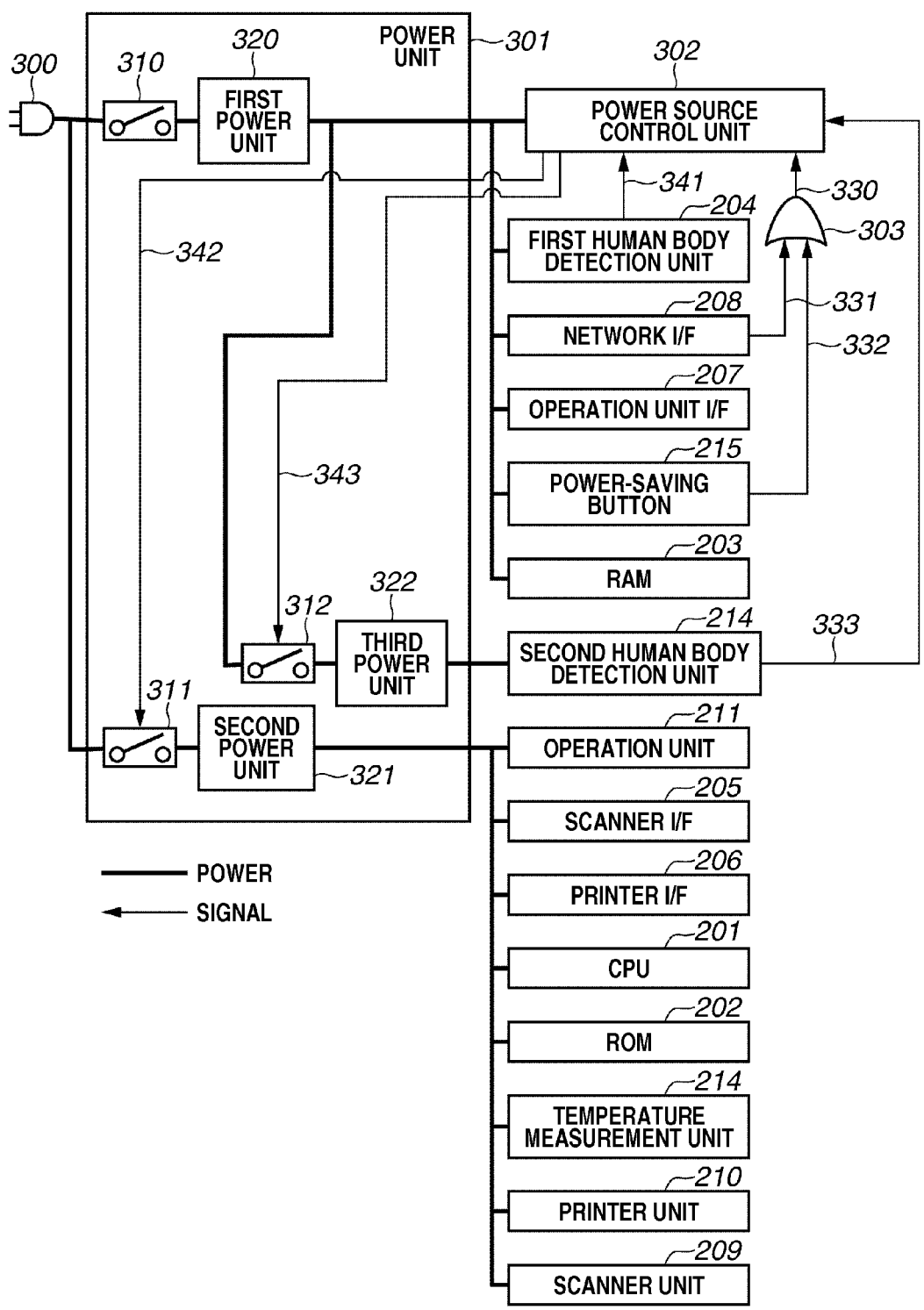
FIG. 22 is block diagram illustrating an example of configuration of a power source management unit according to of the second exemplary embodiment.

Hereinbelow, while referring to FIG. 22, the details of configuration and power control of the power source management unit 213 in the second exemplary embodiment will be described. FIG. 22 is a block diagram illustrating an example of a configuration of the power source management unit 213 according to the second exemplary embodiment. Descriptions of the same portions as those in the first exemplary embodiment (FIG. 21) will be omitted, and only different portions will be described. In the second exemplary embodiment, electric power from the power 300 is divided into three power units: a first power unit 320, a second power unit 321, and a third power unit 322 via an SW 310, an SW 311, and an SW 312.

In a case where the SW 310 is turned on, electric power is supplied to the power source control unit 302 from the first power unit 320. This will allow the power source control unit 302 to start up. An ON command 342 is transmitted to the SW 311, and an ON command 343 is transmitted to the SW 312 from the power source control unit 302, and electric power is supplied to respective components from the second power unit 321 and the third power unit 322. This will allow the image forming apparatus 102 to shift to the standby state (normal state).

Further, in a case that a condition is satisfied that the image forming apparatus 102 has not been used for a predefined time, the OFF commands are transmitted to the SW 311 and the SW 312, and power supply to the second power unit 321 and the third power unit 322 from the power source control unit 302 are shut off, so that the image forming apparatus 102 shifts to the sleep state (power saving state). The sleep state is a state which consumes less power consumption than the standby state. Further, the sleep state includes a first power-saving mode in which power supply to the second power unit 321 and the third power unit 322 are shut off, and a second power-saving mode in which power is supplied to the second power unit 321 but power supply to the third power unit 322 is shut off.

The third power unit 322 supplies electric power to the second human body detection unit 214. In the example of FIG. 22, power is supplied to the second power unit 321 from the first power unit 320, but power may be supplied from the power 300.

A condition for shifting from the first power-saving mode to the second power-saving mode is that the first human body detection unit 204 has detected a human. The first human body detection unit 204, when detecting a human, transmits the detection signal 341 to the power source control unit 302. The power source control unit 302, upon receiving the detection signal 341, transmits the ON command 343 to the SW 312. When the SW 312 is turned on by the ON command 343, electric power is supplied to the third power unit 322. Thus, electric power is supplied to the second human body detection unit 214 from the third power unit 322.

Next, a condition for shifting to the standby state will be described. The second human body detection unit 214, when detecting a human, transmits the detection signal 333 to the power source control unit 302. Further, in a case that one request signal (331, 332) for shifting to the standby state is received, the logic 303 transmits a shift request signal 330 to the power source control unit 302. The power source control unit 302, upon receiving the detection signal 333 from the second human body detection unit 214 or the shift request signal 330 from the logic 303, transmits the ON command 342 to the SW 311, and power supply to the second power unit 321 is started. In other words, in the image forming apparatus 102, electric power is supplied to the CPU 201 in the normal state (first electric power state), and electric power is not supplied to the CPU 201 in the power saving state (second electric power state).

Figure 9:
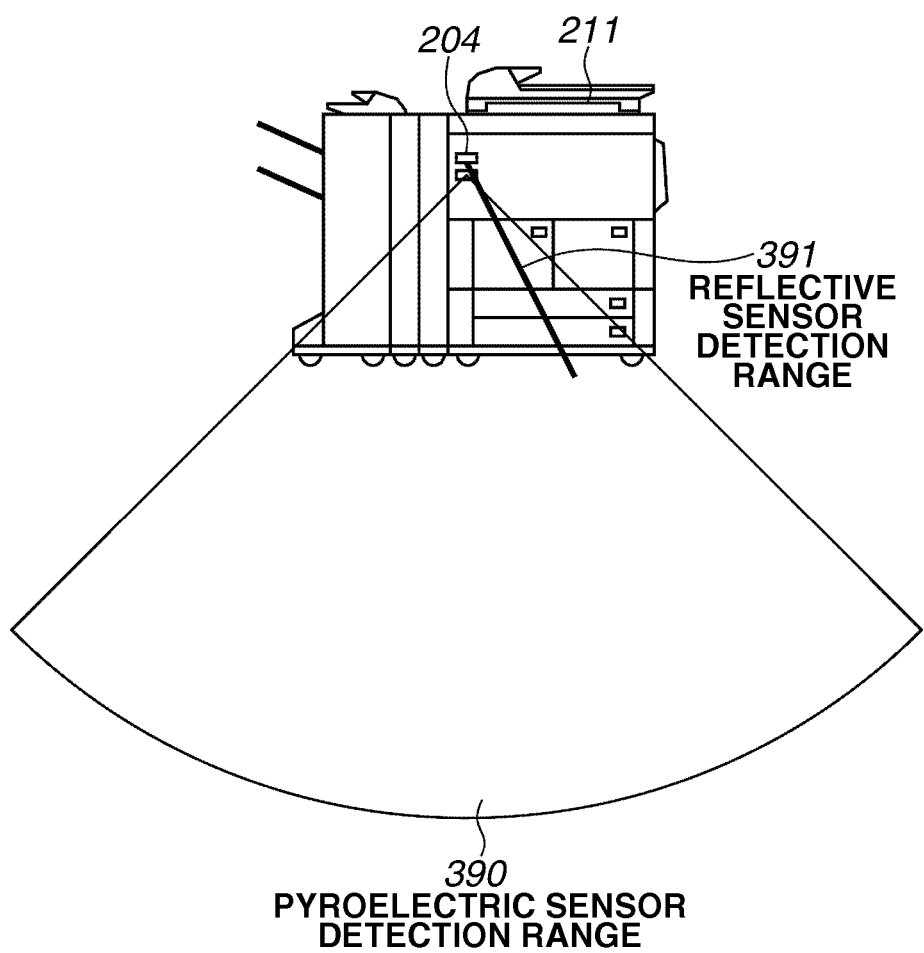
FIG. 9 is a diagram illustrating detection ranges of respective human sensors, when a pyroelectric sensor is used as a primary sensor for a first human body detection unit, and a reflective sensor is used as a secondary sensor for a second human body detection unit 214.

FIG. 9 is a diagram illustrating detection ranges of respective human sensors when a pyroelectric sensor is used as a primary sensor for the first human body detection unit 204, and a reflective sensor is used as a secondary sensor for the second human body detection unit 214.

Similarly to the first exemplary embodiment, the first human body detection unit 204 (pyroelectric sensor) is attached on a front surface of the image forming apparatus 102, and has a detection range 390 in a radiation direction obliquely toward downward. On the other hand, the second human body detection unit 214 (reflective sensor) is attached on a front surface of the image forming apparatus 102. The second human body detection unit 214 (reflective sensor) is set up to be horizontal with floor, so that it can detect a user who stands to operate the operation unit 211, and is set up so that a detection range 391 falls inside the detection range 390 of the pyroelectric sensor (the first human body detection unit 204) serving as the primary sensor.

Figure 10:
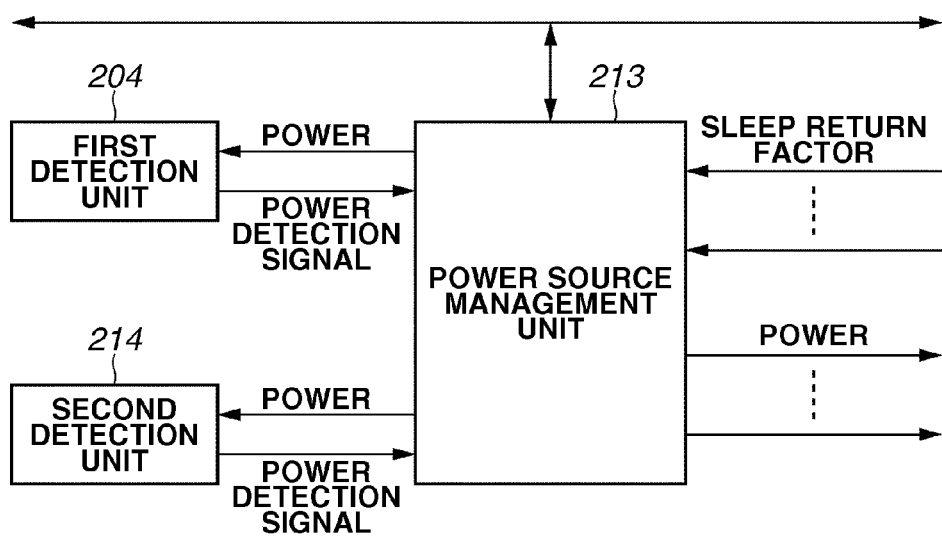
FIG. 10 is a block diagram illustrating a relationship between a power source management unit and two human sensors.
Figure 11:
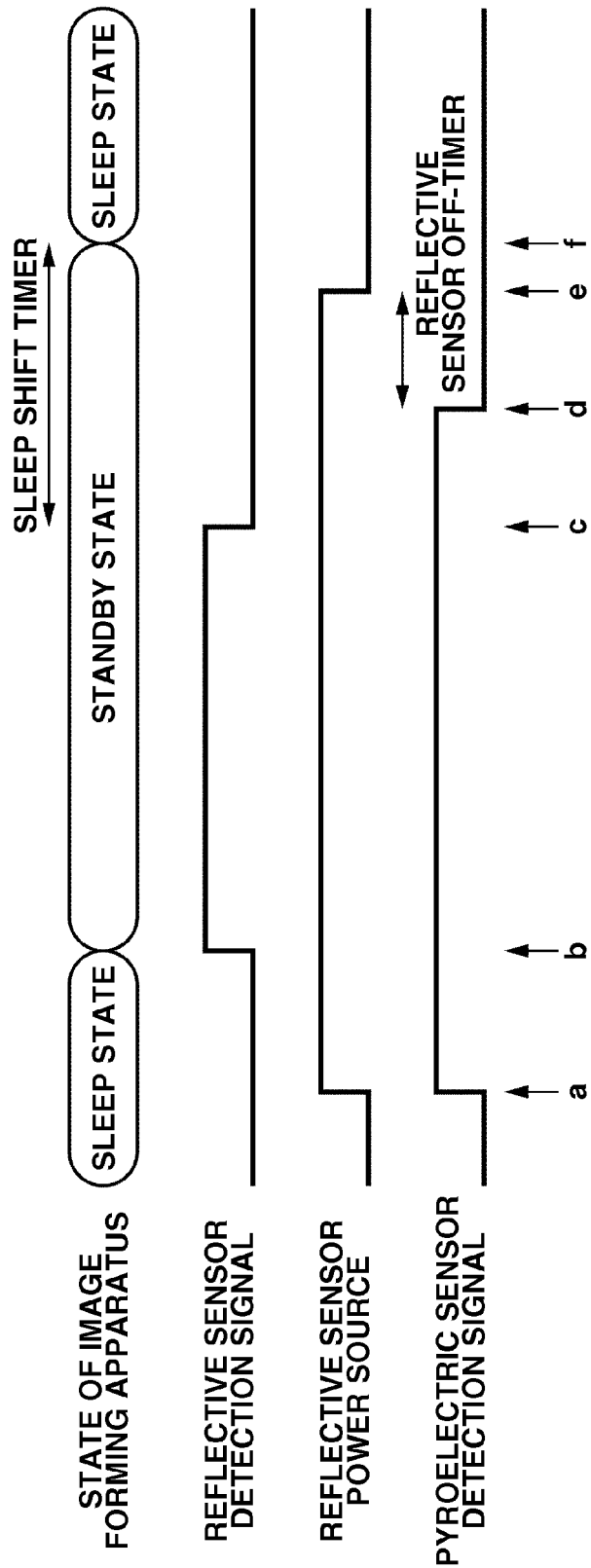
FIG. 11 is a timing chart illustrating a relationship between detection situations of two human sensors and the image forming apparatus.

Hereinbelow, detection situations of two human sensors and electric power states of the image forming apparatus 102 will be described with reference to FIG. 10 and FIG. 11. FIG. 10 is block diagram illustrating a relationship between the power source management unit 213 and two human sensors. FIG. 11 is a timing chart illustrating a relationship between detection situations of two human sensors and the image forming apparatus 102. The image forming apparatus 102 is in the sleep state, and electric power is not supplied to the second human body detection unit 214 (reflective sensor) which consumes relatively high power. At a spot "a" (FIG. 11), a user moves into the detection range 390 of the first human body detection unit 204 (pyroelectric sensor) and is detected. As illustrated in FIG. 10, the power source management unit 213, upon receiving the detection signal (341 in FIG. 22) that detects a human body from the pyroelectric sensor, supplies power (power source of the third power unit 322) of the second human body detection unit 214 (reflective sensor). The second human body detection unit 214 (reflective sensor) supplied with the power begins to emit infrared rays and starts detection of a human body approach.

At a spot "b" (FIG. 11), in order to operate the image forming apparatus 102, the user further approaches the image forming apparatus 102, enters within the detection range 391 of the second human body detection unit 214 (reflective sensor) and is detected. Then, the detection signal (341 in FIG. 22) is transmitted to the power source management unit 213. Then, since both two human sensors have detected a human body approach, the power source management unit 213 initiates a return-from-sleep operation, and the image forming apparatus 102 shifts to the standby state in the course of time.

Thereafter, at a spot "c" (FIG. 11), the user ends operation in the image forming apparatus 102, and moves out of the detection range 391 of the second human body detection unit 214 (reflective sensor). When the second human body detection unit 214 (reflective sensor) cannot detect human body any longer, the power source control unit 302 of the power source management unit 213 starts time measurement with a sleep shift timer until shifting to the sleep state.

Furthermore, thereafter, at a spot "d" (FIG. 11), the user also moves out of the detection range 390 of the first human body detection unit 204 (pyroelectric sensor). When the first human body detection unit 204 (pyroelectric sensor) cannot detect human body any longer, the power source control unit 302 of the power source management unit 213 starts time measurement with a reflective sensor OFF-timer for shutting off the power (power of the third power unit 322) of the second human body detection unit 214 (reflective sensor).

At a spot "e" (FIG. 11), when the reflective sensor OFF-timer reaches a predefined time, the power source management unit 213 shuts off the power (power of the third power unit 322) of the second human body detection unit 214 (reflective sensor). Thereafter, when also the sleep shift timer reaches a predefined time, similarly, the power source management unit 213 shuts off power of unnecessary modules (power of the second power unit 321) since the image forming apparatus enters the sleep state. In this way, by performing power control with the power source control unit 302 of the power source management unit 213, both inhibition of erroneous detection of pedestrian and high energy-saving performance can be realized.

Both human sensors in the image forming apparatus according to the present exemplary embodiment may become unable to properly operate. In other words, a situation may occur the pyroelectric sensor (the first human body detection unit 204) serving as the primary sensor and the reflective sensor (the second human body detection unit 214) serving as the secondary sensor both malfunction.

Hereinbelow, in the second exemplary embodiment, control procedure of the image forming apparatus 102 when a failure occurs in either of the two human sensors will be described with reference to FIG. 12. S1201 through S1215 indicate respective steps. Further, the processing in steps S1202 through S1215 is realized by causing the CPU 201 to read and execute a program computer-readably recorded on the ROM 202 in the image forming apparatus 102.

Figure 12:
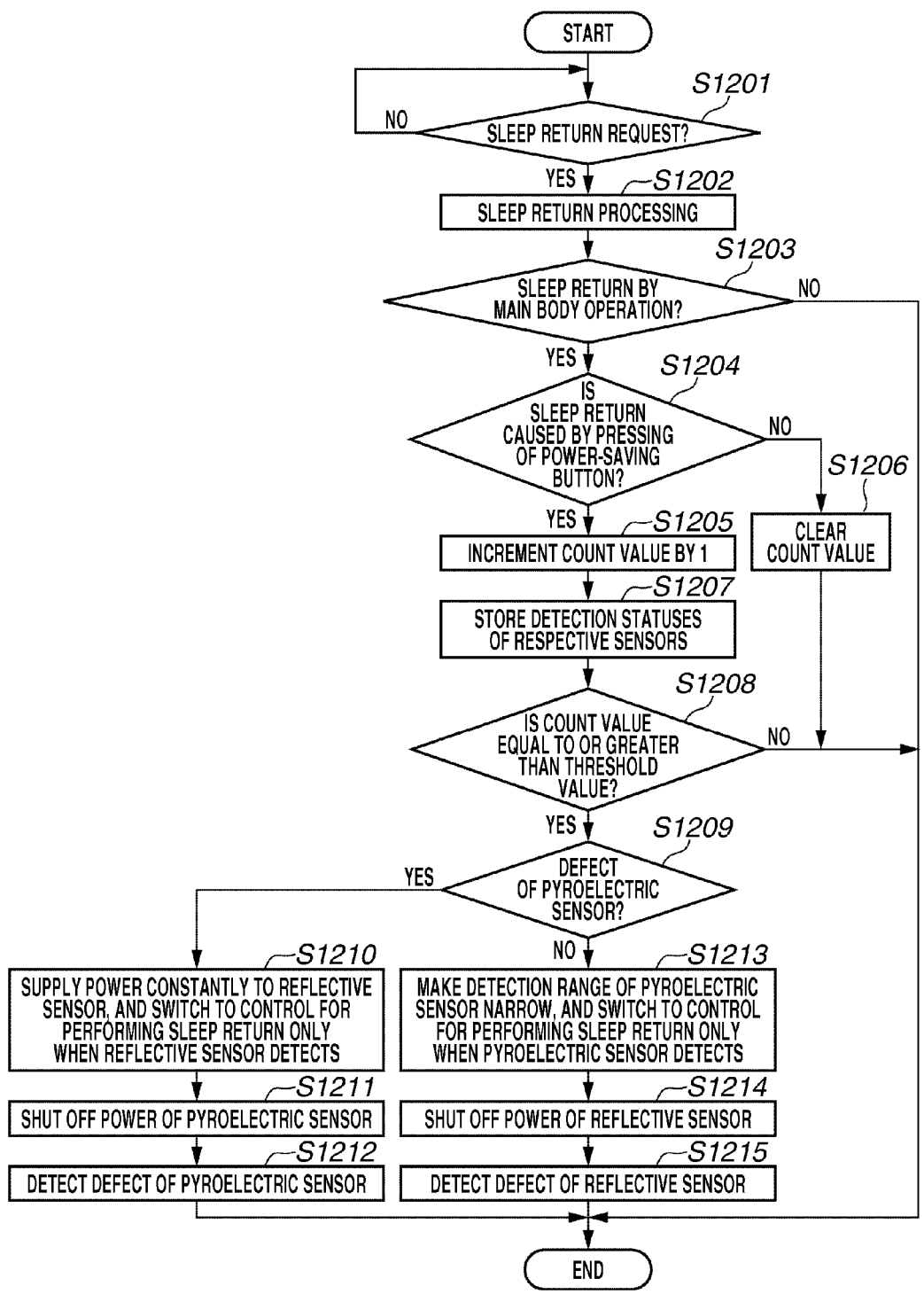
FIG. 12 is a flowchart illustrating an example of control procedure of the image forming apparatus in the second exemplary embodiment.

The processing in FIG. 12 is started from a state where the image forming apparatus 102 has entered the sleep state.

The processing in steps S1201 through S1206 are similar to the processing in steps S501 through S506 of FIG. 5 described previously and therefore descriptions thereof will be omitted.

In the present exemplary embodiment, step S1207 is added after step S1206. In step S1207, the CPU 201 writes detection states of two human sensors at the time of return from sleep in the return-from-sleep factor management table and stores them in a storage medium such as the ROM 202 or the RAM 203.

Next, in step S1208, the CPU 201 compares a value of a counter indicating a number of times of consecutive returns by the power saving button 215 with a predetermined threshold value. Then, in the above step S1208, if it is determined that a value of a counter indicating a number of times of consecutive returns by presses of the power saving button 215 by the user is smaller than the predetermined threshold value (NO in step S1208), the CPU 201 ends the processing in the flowchart, while maintaining the count value.

On the other hand, in the above step S1208, if it is determined that the count value is equal to or greater than the threshold value (YES in step S1208), the CPU 201 determines that a certain failure is occurring in either of two human sensors, and advances the processing to step S1209. The threshold value can be freely set, for example, by the user operating the operation unit 211.

In step S1209, the CPU 201 checks for the return-from-sleep factor management table stored in the storage medium in the above step S1207, and determines which human sensor a failure is occurring in.

First, a case where a certain failure is occurring in the pyroelectric sensor will be described. FIG. 13 illustrates an example of the return-from-sleep factor management table when a certain failure is occurring in the pyroelectric sensor. In FIG. 13, a symbol "o" indicates that there was a sensor detection or there was a button press at the time of return from sleep, and "x" indicates that there was not a sensor detection or there was not a button presses at the time of return from sleep. Further, the example of FIG. 13 indicates an example where the above-described threshold value is 5.

In the example illustrated in FIG. 13, it can be seen that both the pyroelectric sensor and the reflective sensor could not detect, and returns from sleep by presses of the power saving button 215 by the user were performed 5 times consecutively. This indicates that a certain failure is occurring in the pyroelectric sensor (the first human body detection unit 204) serving as the primary sensor, and that the user cannot be detected even when the user moves into the detection range 390 of the pyroelectric sensor. Since the pyroelectric sensor cannot detect an approach of the user, it can be seen that the power (power supply from the third power unit 322) cannot be supplied any longer to the reflective sensor (the second human body detection unit 214) serving as the secondary sensor.

Therefore, since the reflective sensor is not supplied with the power from the power source management unit 213, even if the user has moved into a range within which the reflective sensor originally should be able to detect the user, the reflective sensor cannot detect the user. As a result, both the pyroelectric sensor and the reflective sensor cannot detect the user, and therefore the user ends up returning from sleep by pressing the power-saving button 215.

Returning to descriptions of the flowchart in FIG. 12, in step S1209, the CPU 201 checks for the return-from-sleep factor management table, and if all the detection states corresponding to the threshold value (5 times in the example) from the data latest stored in the return-from-sleep factor management table are states where there are no detections in both the pyroelectric sensor and the second reflective sensor. In other words, if states where both the pyroelectric sensor and the reflective sensor remain unable to consecutively detect the user occur for a number of times of the threshold value, the CPU 201 determines (confirms) that failure is occurring in the first human body detection unit 204 (pyroelectric sensor), and advances the processing to step S1210.

In step S1210, the CPU 201, even when failure is occurring in the pyroelectric sensor, switches the control to enable return-from-sleep by restricting a function. Specifically, since failure is occurring in the pyroelectric sensor, in step S1210, the CPU 201 gives an instruction to ensure that the power of the second human body detection unit 214 (the reflective sensor) is constantly supplied, to the power source management unit 213, and switches the control to return from sleep only by detection of human body approach by the reflective sensor.

Next, since failure is occurring in the pyroelectric sensor, in step S1211, the CPU 201 gives an instruction to the power source management unit 213 to shut off supply of the power of the first human body detection unit 204 (pyroelectric sensor). According to the instruction, the power source control unit 302 of the power source management unit 213 performs control to constantly turn on the SW 312.

Figure 15:
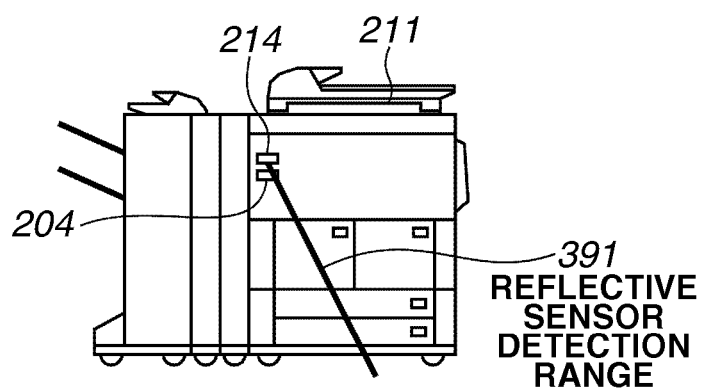
FIG. 15 is a diagram illustrating an example of human body detection range of the image forming apparatus at the time that a return-from-sleep operation is controlled only by the reflective sensor detecting the human body.

FIG. 15 illustrates an example of a human body detection range of the image forming apparatus when control to return from sleep is carried out only by detection of the reflective sensor. As illustrated in FIG. 15, in the image forming apparatus 102, power supply of the pyroelectric sensor is shut off, and only the reflective sensor senses human body approach.

Returning to FIG. 12, in step S1212, the CPU 201 displays the message (FIG. 17) that notifies the defect of the pyroelectric sensor on the display unit 212 of the operation unit 211, and ends the processing in the flowchart.

Figure 17:
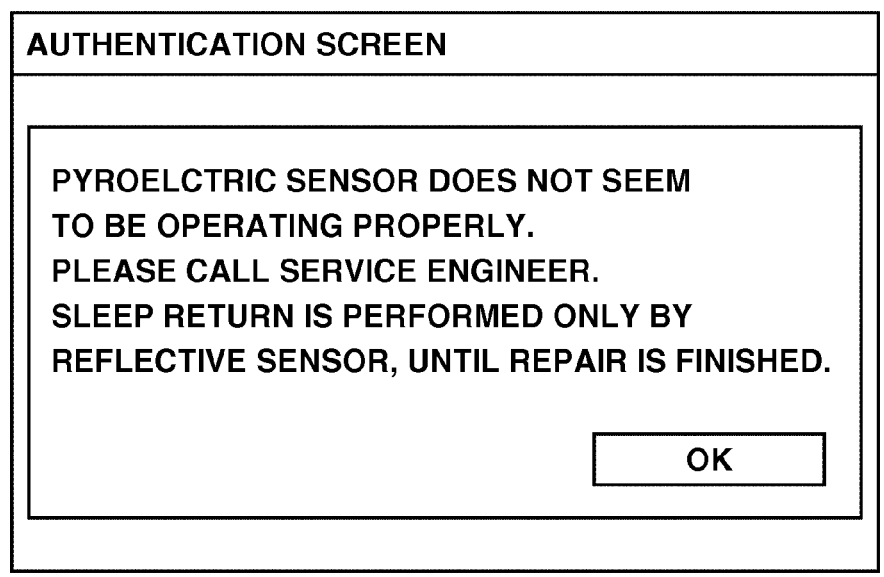
FIG. 17 illustrates an example of a display that notifies a failure of the pyroelectric sensor.

FIG. 17 illustrates an example of a display that notifies the defect of the pyroelectric sensor. In this way, the image forming apparatus 102 according to the present exemplary embodiment, at timing that the return from sleep is finished, and a login authentication screen is displayed, notifies the defect of the pyroelectric sensor, and displays a message that prompts the user to make a service engineer call for repairing, on the display unit 212. Further, until repair by the service engineer is finished, a message saying that return from sleep is to be performed by restricting a function, using only the reflective sensor is displayed. Alternatively, similarly to the first exemplary embodiment, a message may be transmitted to the information processing apparatuses 100, 101 of predefined administrators, connected to the LAN 103.

Since the reflective sensor is constantly supplied with power by performing control as described above, although energy-saving performance will be somewhat lowered, return from sleep by the reflective sensor detecting human body approach can be executed even during a repairing time until the service engineer finishes the repairing.

Next, a case where a certain failure is occurring in the reflective sensor will be described. FIG. 14 illustrates an example of the return-from-sleep factor management table, when a certain failure is occurring in the reflective sensor. In FIG. 14, a symbol "o" indicates that sensor detection occurred during return from sleep, or button press was performed, and "x" indicates that sensor detection did not occur during return from sleep, or button press was not performed. Further, the example in FIG. 14 indicates a case when the threshold value is 5, similarly to the example in FIG. 13.

In the example in FIG. 14, it can be seen that the pyroelectric sensor is able to detect, but the reflective sensor is not able to detect, and the return from sleep occurs 5 times consecutively by presses of the power saving button 215 by the user. This indicates that the pyroelectric sensor (the first human body detection unit 204) serving as the primary sensor is properly operating, but a certain failure is occurring in the reflective sensor (the second human body detection unit 214) serving as the secondary sensor, and it cannot detect a user even when the user moves into a detection range of the reflective sensor. Since the pyroelectric sensor (the first human body detection unit 204) is able to detect an approach of the user, the CPU 201 gives an instruction to the power source management unit 213, and power is being supplied to the reflective sensor (the second human body detection unit 214). However, it can be seen that failure is occurring in the reflective sensor (the second human body detection unit 214) serving as the secondary sensor, and it is not able to detect an approach of the user. As a result, the user ends up returning from sleep by pressing the power saving button 215.

Hereinbelow, descriptions is returned to the flowchart in FIG. 12. In the above step S1209, the CPU 201 checks for the return from sleep factor management table. If all the detection states corresponding to the threshold value (5 times in the example) from the data latest stored in the return from sleep factor management table, indicate that there are detections in the pyroelectric sensor and there are no detections in the reflective sensor, in other words, if consecutively the pyroelectric sensor is able to detect, but the reflective sensor is not able to detect a number of times corresponding to the threshold value (5 times), the CPU 201 determines (confirms) that failure is occurring in the second human body detection unit 214 (the reflective sensor), and advances the processing to step S1213.

In step S1213, the CPU 201, even when failure is occurring in the reflective sensor, switches the control to enable return-from-sleep by restricting the function. Specifically, since failure is occurring in the reflective sensor, in step S1213, the CPU 201 switches the control to return from sleep only by detection of human body approach by the first human body detection unit 204 (pyroelectric sensor). However, a detection range of human body approach of the first human body detection unit 204 (pyroelectric sensor) is wide in the radiation direction. Therefore, if this goes on as is, it is possible that the pyroelectric sensor erroneously detects pedestrians, leading to frequent returns from sleep. Therefore, in order to avoid erroneous detections of pedestrians, the CPU 201 performs control to narrow a detection range of the pyroelectric sensor, by altering a threshold value of change amount of infrared rays indicating human body detections which the first human body detection unit 204 (pyroelectric sensor) outputs.

Since failure is occurring in the second human body detection unit 214 (the reflective sensor), in step S1214, the CPU 201 gives an instruction to the power source management unit 213, to constantly shut off supply of power to the second human body detection unit 214 (the reflective sensor). According to the instruction, the power source control unit 302 of the power source management unit 213 performs control to constantly turn off the SW 312.

Figure 16:
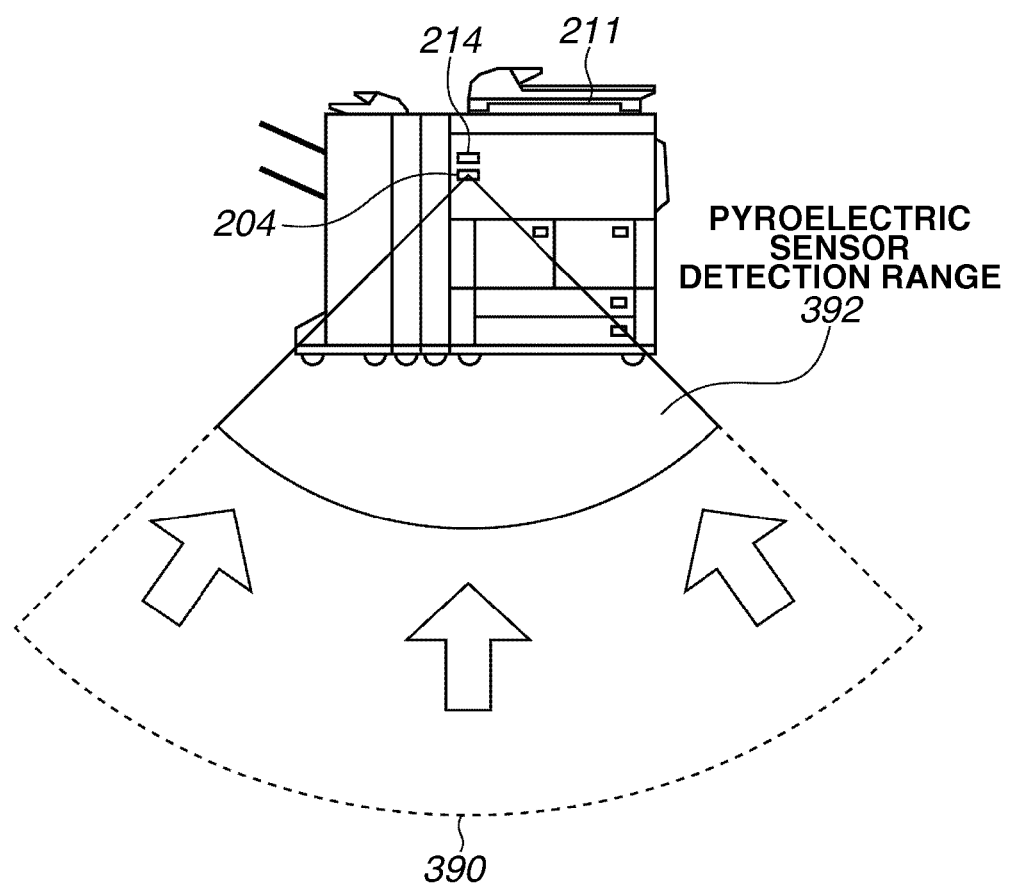
FIG. 16 is a diagram illustrating an example of a human body detection range of the image forming apparatus at the time that the return-from-sleep operation is controlled only by the pyroelectric sensor detecting the human body.

FIG. 16 illustrates an example of a human body detection range of the image forming apparatus, when control to return from sleep is performed only by detection of the pyroelectric sensor. As illustrated in FIG. 16, in the image forming apparatus 102, it can be seen that a detection range 392 of the first human body detection unit 204 (pyroelectric sensor) is narrower than the range 390 (detection range at an initial state) that was set initially. Further, even when the user moves into the detection range 392 of the pyroelectric sensor and the pyroelectric sensor detects it, power is not supplied to the reflective sensor serving as the secondary sensor. By doing so, functions are restricted so that return-from-sleep can be executed while inhibiting erroneous detections of pedestrians as far as possible, even if sensing is carried out only by the pyroelectric sensor.

Hereinbelow, descriptions are returned to the flowchart in FIG. 12. Next, in step S1215, the CPU 201 displays a message (FIG. 18) that notifies a defect of the reflective sensor on the display unit 212 of the operation unit 211, and ends the processing in the flowchart.

Figure 18:
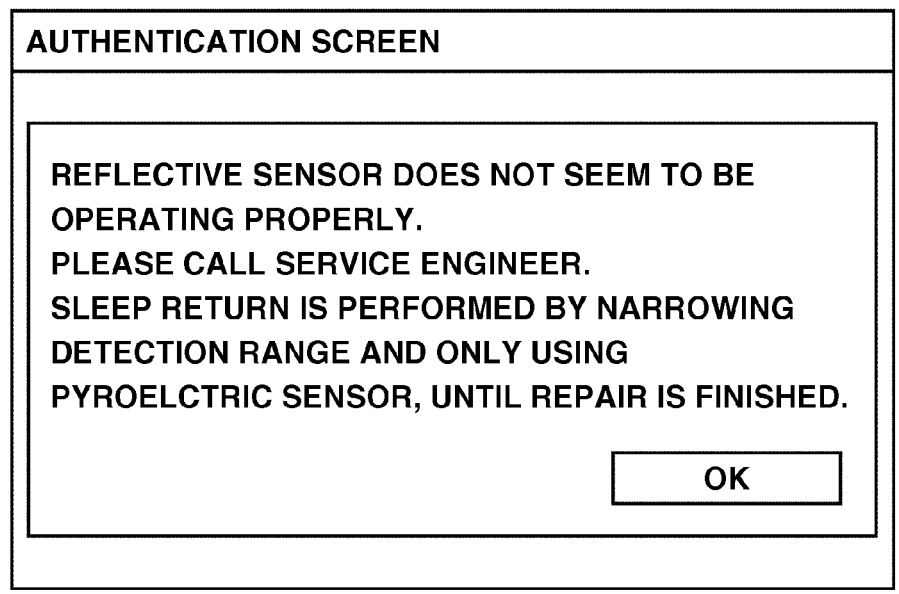
FIG. 18 illustrates an example of a display that notifies a failure of the reflective sensor.

FIG. 18 illustrates an example of a display that notifies a defect of the reflective sensor. In this way, the image forming apparatus 102 according to the present exemplary embodiment, at timing that the return from sleep ends, and a login authentication screen is displayed, notifies a defect of the reflective sensor, and displays a message that prompts the user to make a service engineer call for repairing on the display unit 212. Further, there is displayed a message saying that return-from-sleep is performed by restricting functions only with the pyroelectric sensor, during a repairing time until repair by the service engineer is finished. Further, similarly to the first exemplary embodiment, a message may be transmitted to the information processing apparatuses 100, 101 of the predetermined administrators, connected to the LAN 103.

By control as described above, since detection of human body approach is achieved only by the pyroelectric sensor, the effect of inhibiting erroneous detection with two human sensors having different characteristics, will be deteriorated, but even during a repairing time until the service engineer finishes the repairing, return from sleep can be executed when human body approach is detected by the pyroelectric sensor. Frequent returns from sleep due to noises of pedestrians or the like can be prevented by narrowing the detection range of the pyroelectric sensor.

Therefore, even when a certain failure is occurring in either of two human sensors, return from sleep can be executed by detecting human body approach.

In the above-described first exemplary embodiment, and the second exemplary embodiment, a case is described where a certain failure is occurring in a human sensor, and even if a human body approaches, the human sensor cannot detect it. However, as a failure mode, not only a case where the human sensor cannot detect the human body, but also a case where the human sensor constantly outputs detection signals is also conceivable. If failure is occurring in the human sensor and it continues to output detection signals, then the image forming apparatus 102 cannot shift from the standby state to the sleep state. In the present third exemplary embodiment, the image forming apparatus 102 determines such a failure in which the human sensor continues to output detection signals, and notifies the user accordingly.

Figure 19:
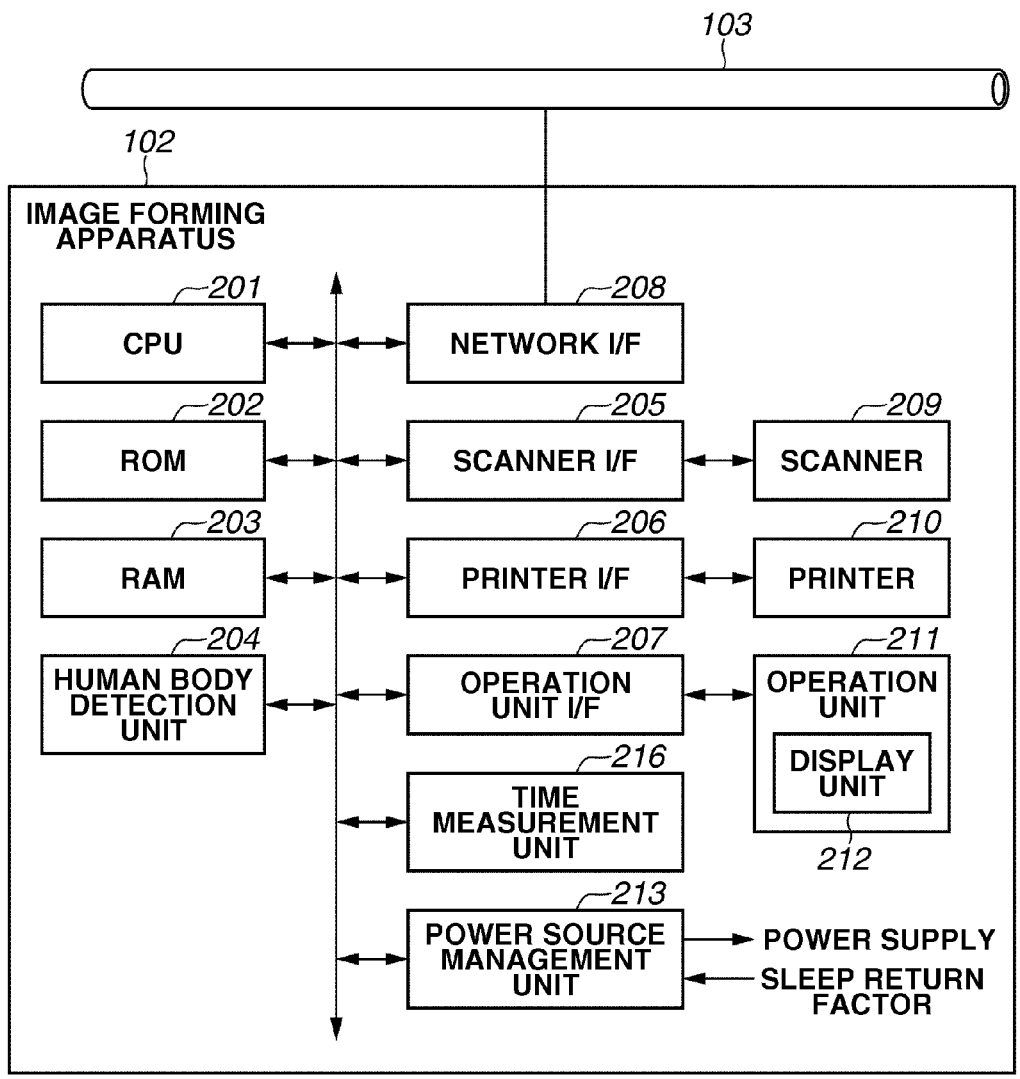
FIG. 19 is block diagram illustrating an example of a configuration of an image forming apparatus according to a third exemplary embodiment.

FIG. 19 is a block diagram illustrating an example of a configuration of the image forming apparatus 102 in the third exemplary embodiment. Identical components to those in the first exemplary embodiment (FIG. 2) are assigned identical reference numerals, and therefore descriptions thereof will be omitted, and only different portions will be described.

As illustrated in FIG. 19, a time measurement unit 216 is further added to the image forming apparatus 102 according to the third exemplary embodiment. The time measurement unit 216 is specifically a timer or a real time clock, and is used to measure time. The configuration other than the time measurement unit 216 is the same as in the first exemplary embodiment (FIG. 2). In the present exemplary embodiment, a pyroelectric sensor is used for the human body detection unit 204. The configuration other than the time measurement unit 216 may be the same as in the second exemplary embodiment (FIG. 8).

Hereinbelow, in the third exemplary embodiment, a control procedure for the image forming apparatus 102 will be described with reference to FIG. 20, in a case where a certain failure is occurring in the pyroelectric sensor, and it is continuing to detect an approach of human body.

Figure 20:
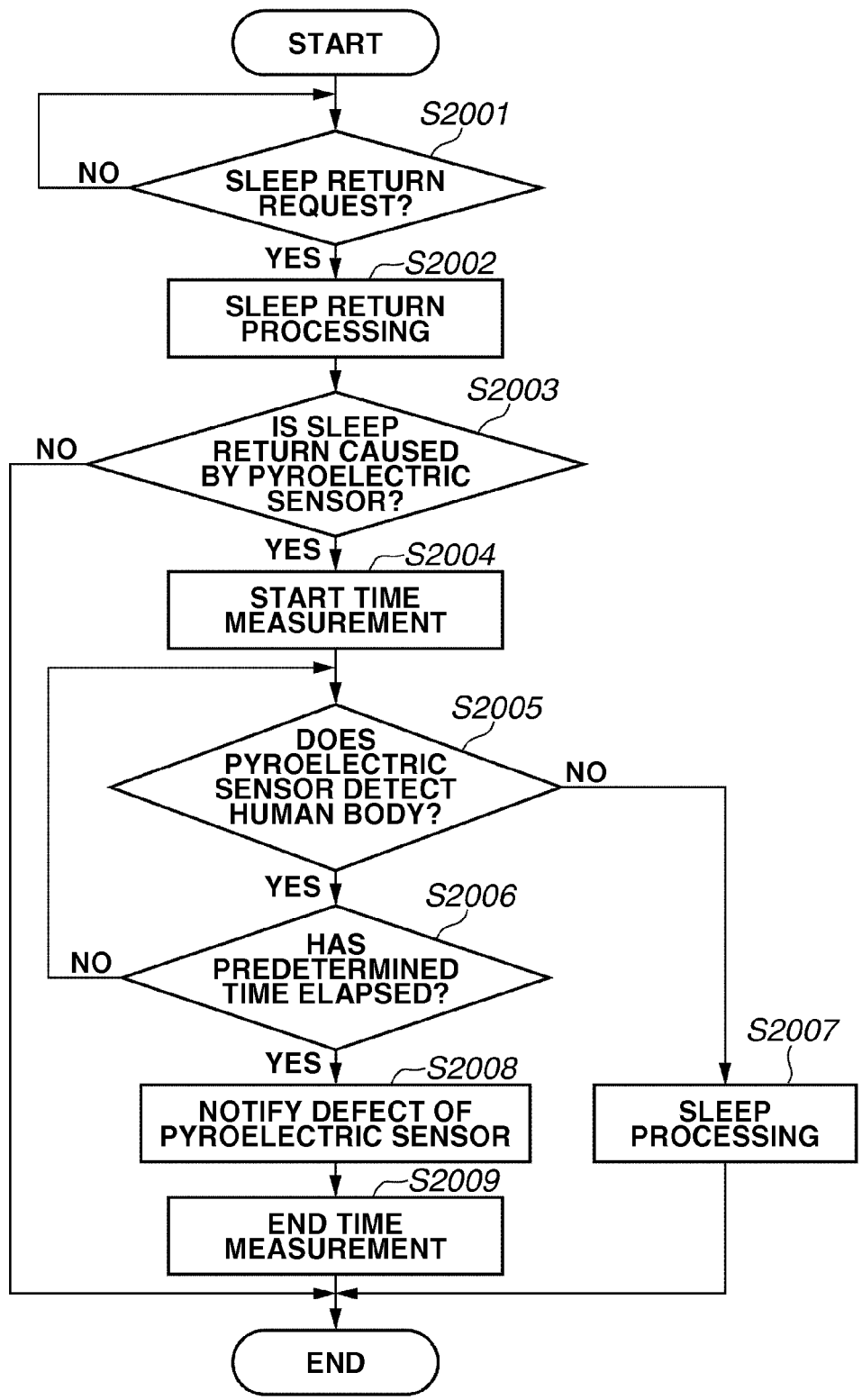
FIG. 20 is a flowchart illustrating an example of control procedure of the image forming apparatus according to the third exemplary embodiment.

FIG. 20 is a flowchart illustrating an example of control procedure of the image forming apparatus 102 in the third exemplary embodiment. Steps S2001 through S2009 indicate respective steps. Further, the processing in steps S2002 through S2009 are realized by causing the CPU 201 to read and execute a program computer-readably recorded on the ROM 202 in the image forming apparatus 102.

The processing in FIG. 20 is started from a state where the image forming apparatus 102 is in the sleep state. The processing in steps S2001 and S2002 are similar to the processing in steps S501 and step S502 in FIG. 5 previously described, and therefore descriptions thereof will be omitted.

In step S2003, the CPU 201 checks for cause of return from sleep. In this process, the CPU 201 checks whether the cause of return from sleep is due to the pyroelectric sensor. In the above step S2003, if it is determined that the cause for return-from-sleep is not due to detection of human body approach by the pyroelectric sensor (NO in step S2003), the CPU 201 directly ends the processing in the flowchart.

On the other hand, in the above step S2003, if it is determined that the cause for return-from-sleep is due to detection of human body approach by the pyroelectric sensor (YES in step S2003), the CPU 201 advances the processing to step S2004.

In step S2004, the CPU 201 starts measurement of time by the time measurement unit 216, and advances the processing to step S2005. In step S2005, the CPU 201 determines whether the pyroelectric sensor has detected a human body (the detection signal 341 is output). Then, if it is determined that the pyroelectric sensor has not detected a human body, for the reason that the user moved out of the detection range of the pyroelectric sensor, for example, (the detection signal 341 is not output) (NO in step S2005), the CPU 201 advances the processing to step S2007.

In step S2007, the CPU 201, if the image forming apparatus 102 is not executing a job, quickly starts shifting to the sleep state (sleep processing), and ends the processing in the flowchart.

On the other hand, if it is determined that the pyroelectric sensor detects a human body (the detection signal 341 is output) for the reason that the user has not moved away from the image forming apparatus 102 or the pyroelectric sensor is out of order, (YES in step S2005), the CPU 201 advances the processing to step S2006.

In step S2006, the CPU 201 performs comparison with a time measured by the time measurement unit 216 to find out whether a predefined time determined by the user in advance has elapsed. In this process, relatively long time is assumed as the predefined time that is determined in advance by the user assumes, for example, for 6 hours, for 12 hours, or for 24 hours, but as the order of time, 10 minutes, 20 minutes, or 30 minutes are also acceptable depending on how the user uses the image forming apparatus (if a user who logs off always in a short time), and it is not limited to these times. Further, such time is stored in the ROM 202, and it is possible for the user to freely set the time, for example, by operating the operation unit 211.

Then, in the above step S2006, if it is determined that the predefined time has not yet elapsed (NO in step S2006), the CPU 201 returns the processing to step S2005. On the other hand, in the above step S2006, if it is determined that the predefined time has already elapsed (YES in step S2006), the CPU 201 determines that a certain failure is occurring in the pyroelectric sensor (the human body detection unit 204), so that it continues to detect the failure, and advances the processing to step S2008.

In step S2008, the CPU 201 displays a message saying that failure is occurring in the pyroelectric sensor to on the display unit 212, and prompts the user to call the service engineer. An example of the screen displayed on the display unit 212 at that time is illustrated in FIG. 7. Similarly to the exemplary embodiment described previously, the message may be transmitted to the information processing apparatuses 100, 101 of the predetermined administrators, connected to the LAN 103.

Finally, in step S2009, the CPU 201 ends time measurement by the time measurement unit 216 that is measuring time, and ends the processing in the flowchart. If it is determined that a certain failure is occurring in the pyroelectric sensor (the human body detection unit 204), and the detection unit continues to detect the failure, the CPU 201 may instruct the power source management unit 213, to shut off power supply to the pyroelectric sensor (the human body detection unit 204), or to neglect the detection signal 341 from the pyroelectric sensor (the human body detection unit 204). According to the instruction, the power source management unit 213 receives the detection signal 341 from the pyroelectric sensor (the human body detection unit 204), and ceases to resume power supply from the second power unit 321. Therefore, even during a repairing time until the service engineer finishes repairing, a situation can be prevented where sleep shift from the standby state to the sleep state cannot be performed due to failure of the pyroelectric sensor (the human body detection unit 204).

As described above, even if the human sensor continues to constantly detect an approach of human body and has continued to emit the detection signal 341 due to its defect, the CPU 201 can automatically detect this defect, notify status of the defect, and can prompt the user to call the service engineer.

In the present exemplary embodiment, a method of detecting that the pyroelectric sensor is still continuing to detect an approach of human body even when the predetermined time has elapsed, and finding a failure of the pyroelectric sensor is described, but another method may be also used. For example, if the operation unit 211 is not operated within the predefined time after return from sleep by the pyroelectric sensor, then it may be determined that a failure has occurred.

As described above, the CPU 201 can determine that the human sensor is not properly operating for some reason, notify an administrator or a user accordingly, and prompt repair by a service engineer. Further, if a plurality of human sensors is equipped, even when either of the human sensors is not properly operating, return from sleep can be realized while restricting functions, using only a detection result of another human sensor.

According to the above-described embodiments, a mechanism is provided that enables delivery of notification to a user that a detection unit for detecting a user and returning the image forming apparatus from the power saving state is not properly operating and prompts repair by a service engineer.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-196362 filed Sep. 6, 2012, which is hereby incorporated by reference herein in its entirety.

What is claimed is:

1. An image forming apparatus that operates in a first electric power state and a second electric power state where less power is consumed than in the first electric power state, the image forming apparatus comprising:
   a first detection unit configured to detect an object in a detection range;
   an operation unit configured to receive an input caused by the object being in the detection range regardless of whether the object is detected, wherein receipt of the input shifts the image forming apparatus from the second electric power state to the first electric power state;
   a control unit configured to, when the first detection unit detects the object or the operation unit receives the input, shift the image forming apparatus from the second electric power state to the first electric power state; and
   a notification unit configured to provide information indicating a failure condition of the first detection unit if the image forming apparatus has shifted from the second electric power state to the first electric power state as a result of the operation unit receiving the input.

2. The image forming apparatus according to claim 1, further comprising:
   a storage unit configured to store a number of times the image forming apparatus shifts from the second electric power state to the first electric power state as a result of the operation unit receiving the input.

3. The image forming apparatus according to claim 2, wherein the notification unit provides information indicating the failure condition of the first detection unit based on the number of times stored in the storage unit.

4. The image forming apparatus according to claim 3, wherein, if the number of times stored in the storage unit exceeds a threshold value, the notification unit provides information indicating the failure condition of the first detection unit.

5. The image forming apparatus according to claim 2, wherein, the number of times stored in the storage unit is a number of times the image forming apparatus consecutively shifts from the second electric power state to the first electric power state as a result of the operation unit receiving the input.

6. The image forming apparatus according to claim 2, wherein, if the image forming apparatus shifts from the second electric power state to the first electric power state when the first detection unit detects an object, the number of times stored in the storage unit is cleared.

7. The image forming apparatus according to claim 1, wherein the first detection unit is a pyroelectric sensor.

8. The image forming apparatus according to claim 1, wherein the first detection unit is an infrared sensor.

9. The image forming apparatus according to claim 1, further comprising:
a second detection unit configured to detect an object,
wherein, when the second detection unit has detected an object, the first detection unit becomes able to detect an object.

10. The image forming apparatus according to claim 1, further comprising:
a first power supply unit configured to supply electric power to the first detection unit and the operation unit; and
a second power supply unit configured to supply electric power to a display unit that displays information provided by the notification unit.

11. The image forming apparatus according to claim 10, wherein, in the first electric power state, the first power supply unit supplies electric power to the first detection unit and the operation unit, and the second power supply unit does not supply electric power to the display unit, and
wherein, in the second electric power state, the second power supply unit supplies electric power to the display unit.

12. An image forming apparatus that operates in a first electric power state and a second electric power state where less power is consumed than in the first electric power state, the image forming apparatus comprising:
a first detection unit configured to detect an object present in a detection range;
an operation unit configured to receive an input caused by the object being in the detection range regardless of whether the object is detected; and
a notification unit configured to, if the first detection unit has not detected the object and the operation unit has received the input, provide information indicating a failure condition of the first detection unit.

13. The image forming apparatus according to claim 12, further comprising:
a storage unit configured to store a number of times the operation unit receives the input without the first detection unit detecting the object,
wherein the notification unit provides information indicating the failure condition of the first detection unit based on the number of times stored in the storage unit.

14. The image forming apparatus according to claim 13, wherein, if the first detection unit has detected the object, the number of times stored in the storage unit is cleared.

15. The image forming apparatus according to claim 12, wherein the first detection unit is a pyroelectric sensor.

16. The image forming apparatus according to claim 12, wherein the first detection unit is an infrared sensor.

17. The image forming apparatus according to claim 12, further comprising:
a first power supply unit configured to supply electric power to the first detection unit and the operation unit; and
a second power supply unit configured to supply electric power to a display unit that displays information provided by the notification unit.

18. The image forming apparatus according to claim 17, wherein, in the first power state, the first power supply unit supplies electric power to the first detection unit and the operation unit, and the second power supply unit does not supply electric power to the display unit, and
wherein, in the second electric power state, the second power supply unit supplies electric power to the display unit.

19. A control method for an image forming apparatus that operates in a first electric power state and a second electric power state where less power is consumed than in the first electric power state, the control method comprising:
shifting, if an object is detected in a detection range, the image forming apparatus from the second electric power state to the first electric power state;
shifting, if receipt of an input, caused by the object being in the detection range regardless of whether the object is detected, is detected, the image forming apparatus from the second electric power state to the first electric power state; and
providing, if the image forming apparatus shifts from the second electric power state to the first electric power state as a result of receipt of the input, information indicating a failure condition of the first detection unit.

20. An image forming apparatus that operates in a first electric power state and a second electric power state where less power is consumed than in the first electric power state, the image forming apparatus comprising:
a sensor;
an operation unit configured to receive a user operation for shifting the image forming apparatus from the second electric power state to the first electric power state;
a control unit configured to, when the sensor detects an object in a detection range or the operation unit receives the user operation, shift the image forming apparatus from the second electric power state to the first electric power state; and
a notification unit configured to notify a user of information indicating a condition of the sensor on the basis that the operation unit receives the user operation without the sensor detecting an object in the detection range.

21. The image forming apparatus according to claim 20, wherein the information is failure information indicating a failure condition of the sensor.

22. The image forming apparatus according to claim 20, wherein the notification unit notifies a user of the information on the basis that the reception, by the operation unit, of the user operation without the sensor detecting an object in the detection range is repeated a predetermined number of times.

23. The image forming apparatus according to claim 20, further comprising a storage unit configured to store a number of times the operation unit receives the user operation without the sensor detecting an object in the detection range.

24. The image forming apparatus according to claim 23, wherein the notification unit notifies a user of the information on the basis that the number of times stored in the storage unit exceeds a predetermined number of times.

25. The image forming apparatus according to claim 20, wherein the notification unit is a display unit configured to display a screen including the information indicating a condition of the sensor.

26. The image forming apparatus according to claim 20, wherein the sensor is a pyroelectric sensor.

27. The image forming apparatus according to claim 20, wherein the sensor is an infrared sensor.

28. The image forming apparatus according to claim 20, further comprising:
a printing unit configured to print image on a sheet; and
a control unit configured to control the printing unit.

29. The image forming apparatus according to claim 28, wherein
power is supplied to the printing unit and the control unit in the first electric power state, and
power is not supplied to the printing unit and the control unit in the second electric power state.

* * * * *